United States Patent [19]

Benzing, II et al.

[11] Patent Number: 6,126,780
[45] Date of Patent: *Oct. 3, 2000

[54] APPARATUS FOR BUILDING A LAMINATE AND FORMING A SUBASSEMBLY FOR A TIRE

[75] Inventors: James Alfred Benzing, II, North Canton; William James Head, Ravenna; Daniel Ray Downing, Uniontown, all of Ohio

[73] Assignee: The Goodyear Tire & Rubber Company, Akron, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 09/005,894

[22] Filed: Jan. 12, 1998

Related U.S. Application Data

[60] Division of application No. 08/854,070, May 8, 1997, Pat. No. 5,762,740, which is a continuation-in-part of application No. 08/572,929, Dec. 15, 1995, abandoned, and a division of application No. 08/523,442, Sep. 15, 1995, abandoned, and a division of application No. 08/556,475, Nov. 13, 1995, abandoned, and a continuation-in-part of application No. 08/692,890, Jul. 29, 1996, abandoned, which is a continuation of application No. 08/369,192, Jan. 5, 1995, abandoned.

[51] Int. Cl.$^7$ .................................................. B29D 30/30
[52] U.S. Cl. ...................... 156/406.4; 156/437; 156/500; 156/537; 156/554
[58] Field of Search ..................................... 156/123, 116, 156/96, 133, 405.1, 406.4, 130, 130.5, 437, 130.7, 128.1, 128.6, 129, 117, 111, 554, 243, 500, 244.11, 244.25, 246, 537, 199, 324, 397; 152/525, 548; 264/425; 425/505; 100/176

[56] References Cited

U.S. PATENT DOCUMENTS

| | | |
|---|---|---|
| 1,320,121 | 10/1919 | Brucker . |
| 1,353,769 | 9/1920 | Macbeth et al. . |
| 1,353,934 | 9/1920 | Morris . |
| 1,393,164 | 10/1921 | Reinhardt et al. . |
| 1,502,120 | 7/1924 | Rasmussen . |
| 1,509,363 | 9/1924 | Maynard . |
| 1,544,305 | 6/1925 | Fisher ...................................... 264/175 |
| 1,667,009 | 4/1928 | Matthias . |
| 1,730,307 | 10/1929 | Stevens . |
| 1,770,895 | 7/1930 | Abbott, Jr. . |
| 1,933,692 | 11/1933 | Abbott . |
| 2,345,518 | 3/1944 | Wendel . |
| 2,382,177 | 8/1945 | Schanz ................................... 264/175 |
| 2,649,134 | 8/1953 | Steinle ................................... 156/123 |
| 2,754,887 | 7/1956 | Wykoff ................................... 154/14 |
| 2,941,465 | 6/1960 | Zimmerli ............................... 100/155 |
| 3,027,289 | 3/1962 | Gitzinger ............................... 156/132 |
| 3,234,769 | 2/1966 | Bretschneider .......................... 72/238 |
| 3,237,673 | 3/1966 | Ward ..................................... 152/354 |
| 3,413,921 | 12/1968 | Boatman ................................ 101/248 |
| 3,509,929 | 5/1970 | Delobelle ............................... 152/354 |

(List continued on next page.)

FOREIGN PATENT DOCUMENTS

| | | |
|---|---|---|
| 246497 | 11/1987 | European Pat. Off. . |
| 865603 | 5/1941 | France ................................... 156/397 |
| 59-195406 | 11/1984 | Japan . |
| 5221204 | 8/1993 | Japan . |
| 7-214583 | 8/1995 | Japan . |
| 580838 | 9/1946 | United Kingdom . |

*Primary Examiner*—Geoffrey L. Knable
*Attorney, Agent, or Firm*—David L King

[57] ABSTRACT

A method and apparatus 200 for building a laminate 10A and in forming a subassembly 10 for a pneumatic tire from an assembly of reinforced or unreinforced tire components wherein the method has the steps of providing an apparatus 200 for simultaneously forming, positioning, attaching and conveying a plurality of continuous strips of elastomeric tire components and activating the apparatus simultaneously forming, positioning and attaching the plurality of continuous strips of elastomeric tire components to adjacent strips of tire components as they are conveyed thus forming a laminate 10A of reinforced or unreinforced tire components suitable for use as a subassembly for a pneumatic tire.

20 Claims, 25 Drawing Sheets

U.S. PATENT DOCUMENTS

| | | | |
|---|---|---|---|
| 3,586,581 | 6/1971 | Todd | 156/467 |
| 3,591,439 | 7/1971 | Leblond et al. | 156/396 |
| 3,803,965 | 4/1974 | Alderfer | 83/155 |
| 4,083,738 | 4/1978 | Kahaner | 156/92 |
| 4,090,835 | 5/1978 | Bronson, Jr. et al. | 425/505 |
| 4,210,042 | 7/1980 | Felten | 83/49 |
| 4,232,723 | 11/1980 | Gazuit | 152/350 |
| 4,334,448 | 6/1982 | Messerschmitt | 83/171 |
| 4,368,633 | 1/1983 | Nogota | 72/239 |
| 4,393,450 | 7/1983 | Jerard | 364/474 |
| 4,465,536 | 8/1984 | Makino et al. | 156/133 |
| 4,466,473 | 8/1984 | Matyja et al. | 152/354 R |
| 4,552,007 | 11/1985 | Mantovan | 72/239 |
| 4,649,631 | 3/1987 | Orth | 29/700 |
| 4,653,304 | 3/1987 | Feldman et al. | 72/239 |
| 4,685,390 | 8/1987 | Pav et al. | 100/168 |
| 4,733,709 | 3/1988 | Lambillotte et al. | 152/548 |
| 4,768,575 | 9/1988 | Bruner et al. | 152/552 |
| 4,810,317 | 3/1989 | Lang | 156/134 |
| 4,813,319 | 3/1989 | Weyand, Jr. | 83/22 |
| 4,857,123 | 8/1989 | Still et al. | 156/133 |
| 4,877,468 | 10/1989 | Siegenthaler | 156/111 |
| 4,905,493 | 3/1990 | Benedetti | 72/225 |
| 4,946,525 | 8/1990 | Aupic et al. | 156/134 |
| 4,965,733 | 10/1990 | Kimura et al. | 364/474.09 |
| 5,004,516 | 4/1991 | Koga et al. | 156/463 |
| 5,029,502 | 7/1991 | Irie | 83/49 |
| 5,030,079 | 7/1991 | Benzing, II | 425/140 |
| 5,059,274 | 10/1991 | Kumagai | 156/406 |
| 5,062,462 | 11/1991 | Rye et al. | 152/548 |
| 5,100,312 | 3/1992 | Wiener | 100/176 |
| 5,267,595 | 12/1993 | Lampe | 152/525 |
| 5,273,601 | 12/1993 | Sergel et al. | 156/133 |
| 5,327,353 | 7/1994 | Nagano | 364/474.09 |
| 5,327,807 | 7/1994 | Chang | 83/783 |
| 5,328,532 | 7/1994 | Azuma et al. | 156/134 |
| 5,413,652 | 5/1995 | Bohm et al. | 156/90 |
| 5,513,560 | 5/1996 | Downing . | |

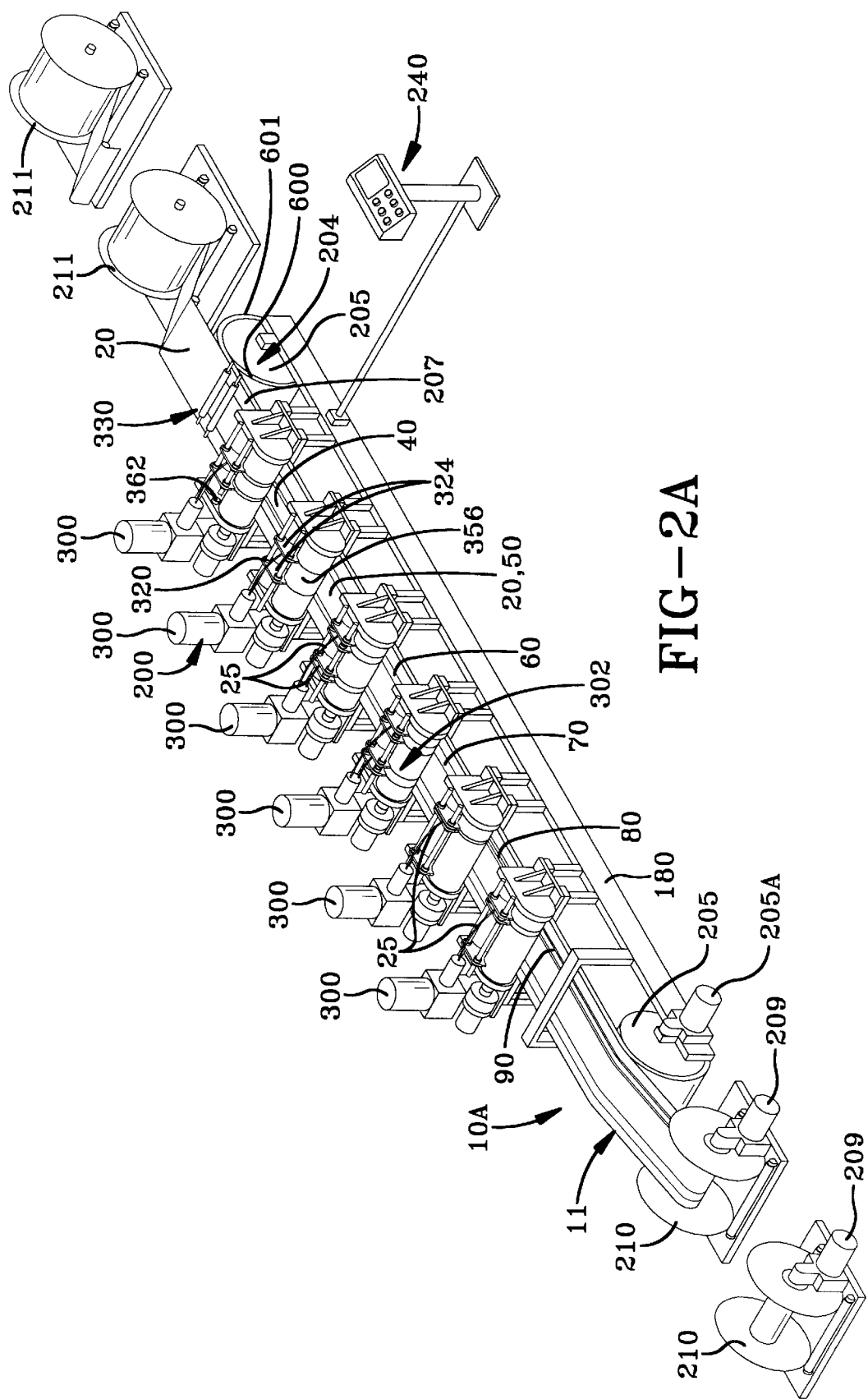

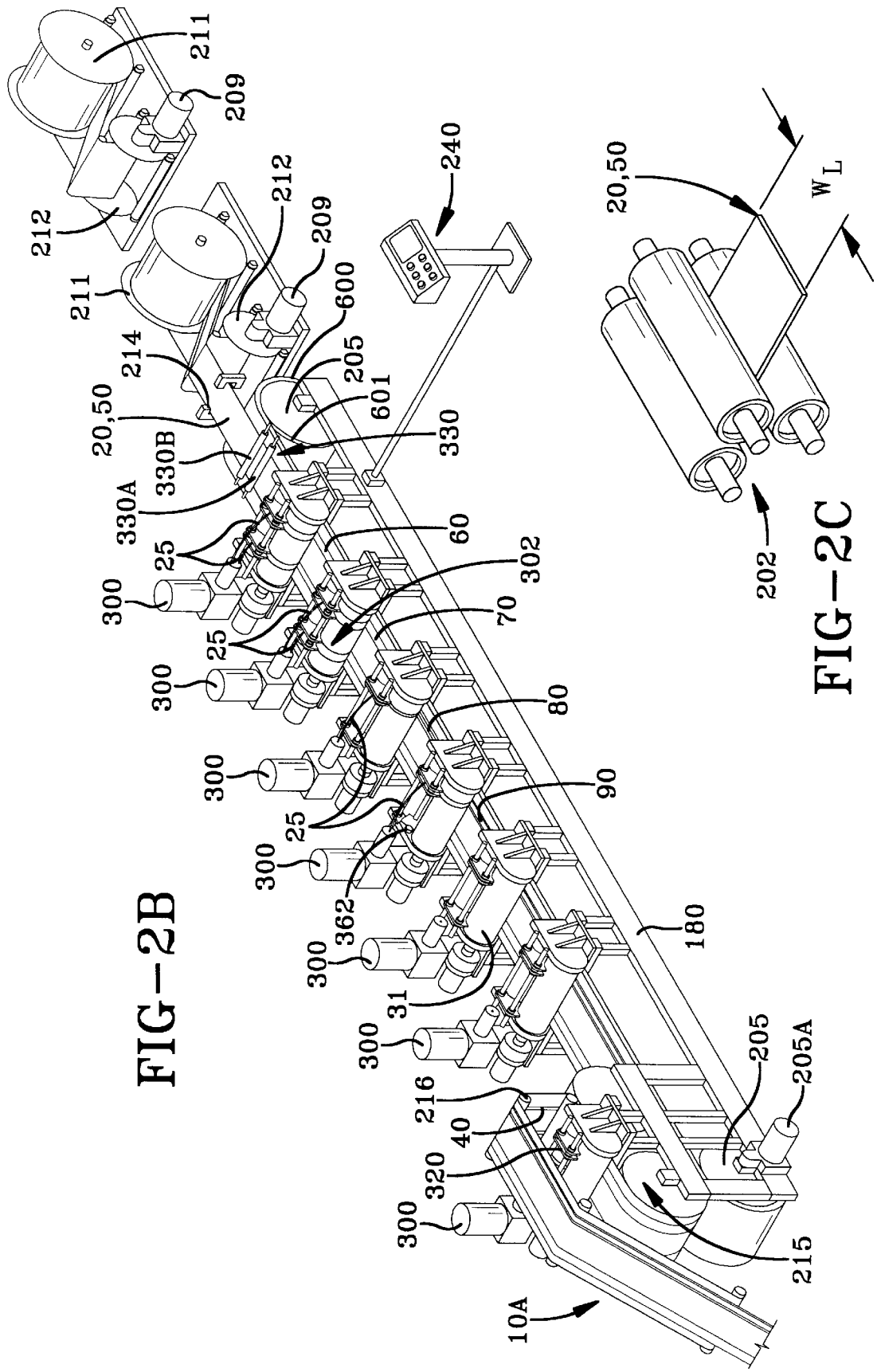

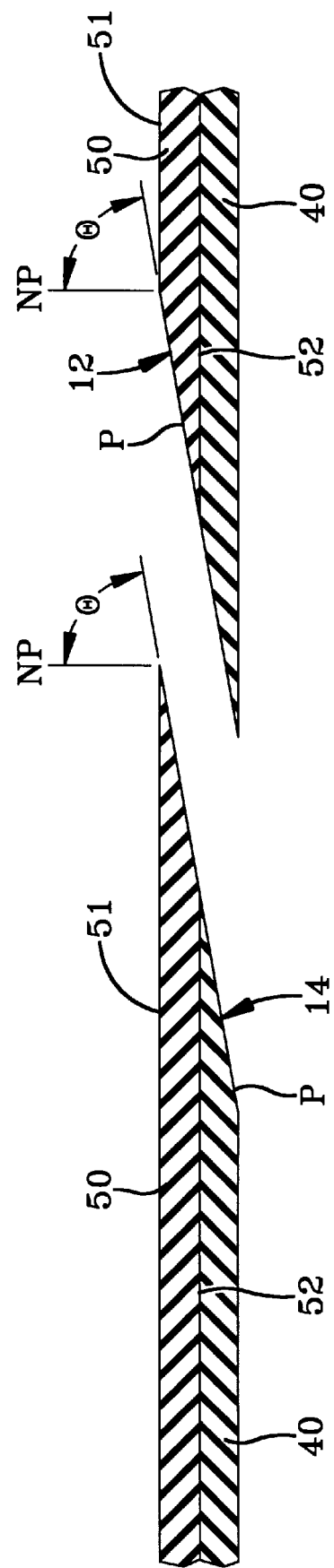

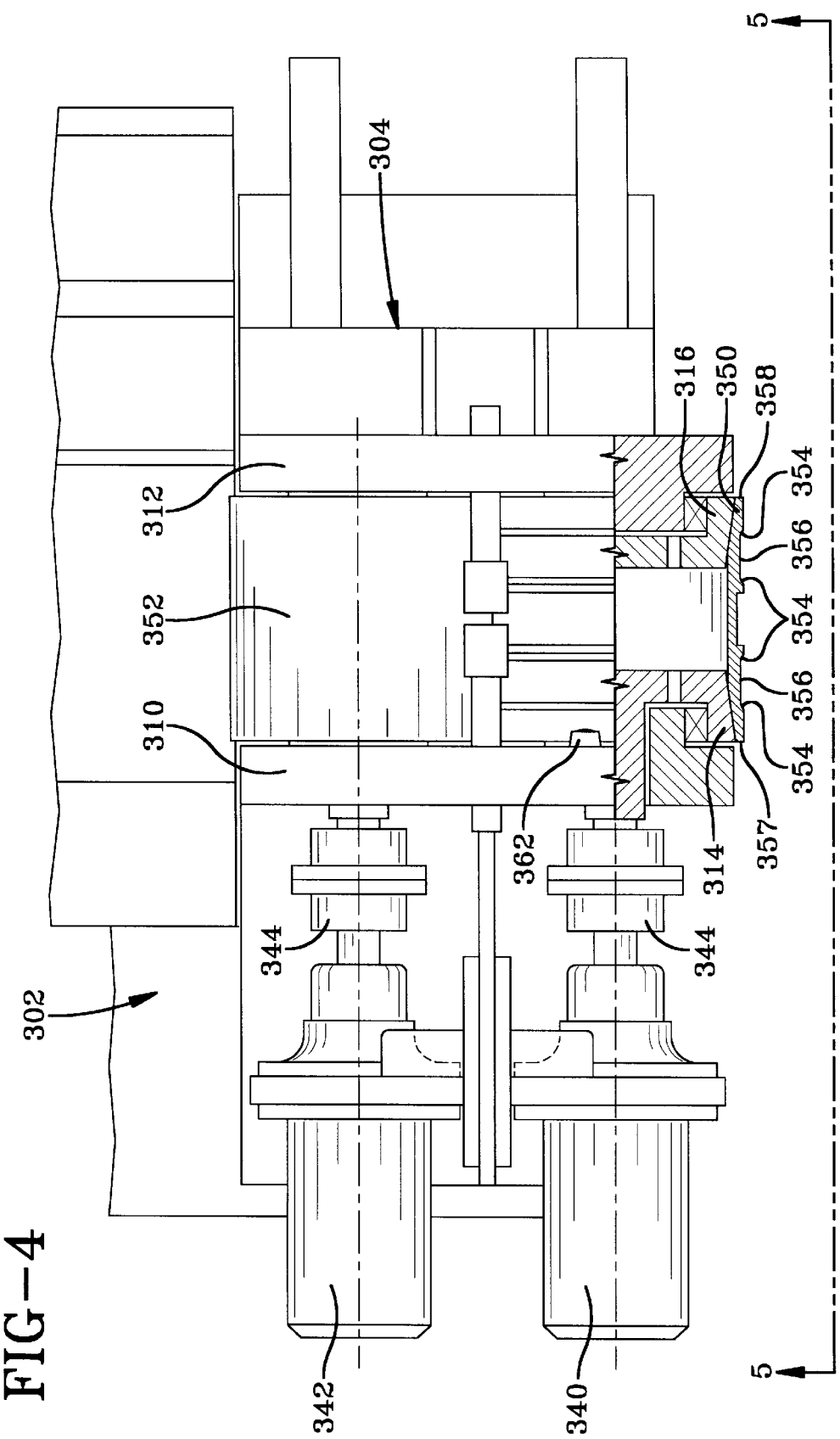

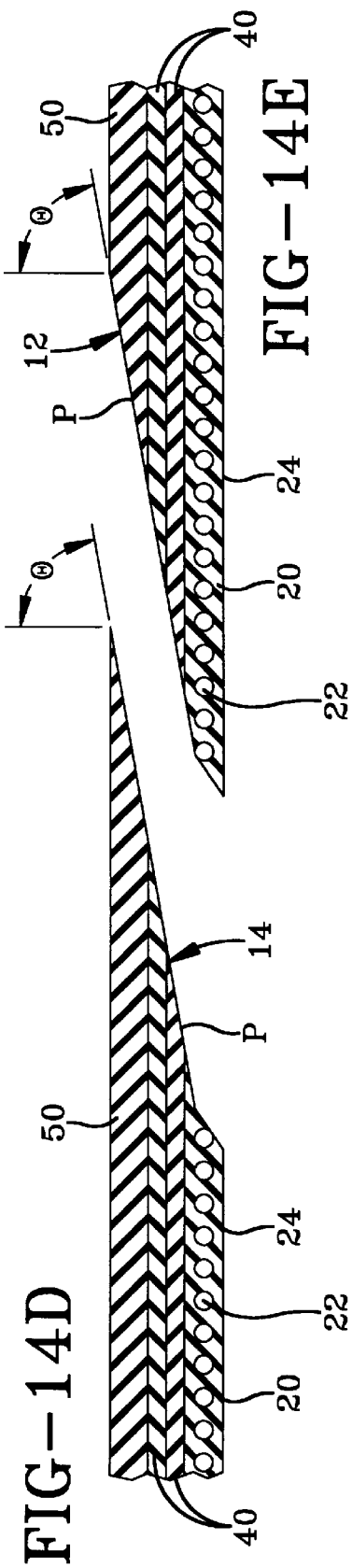

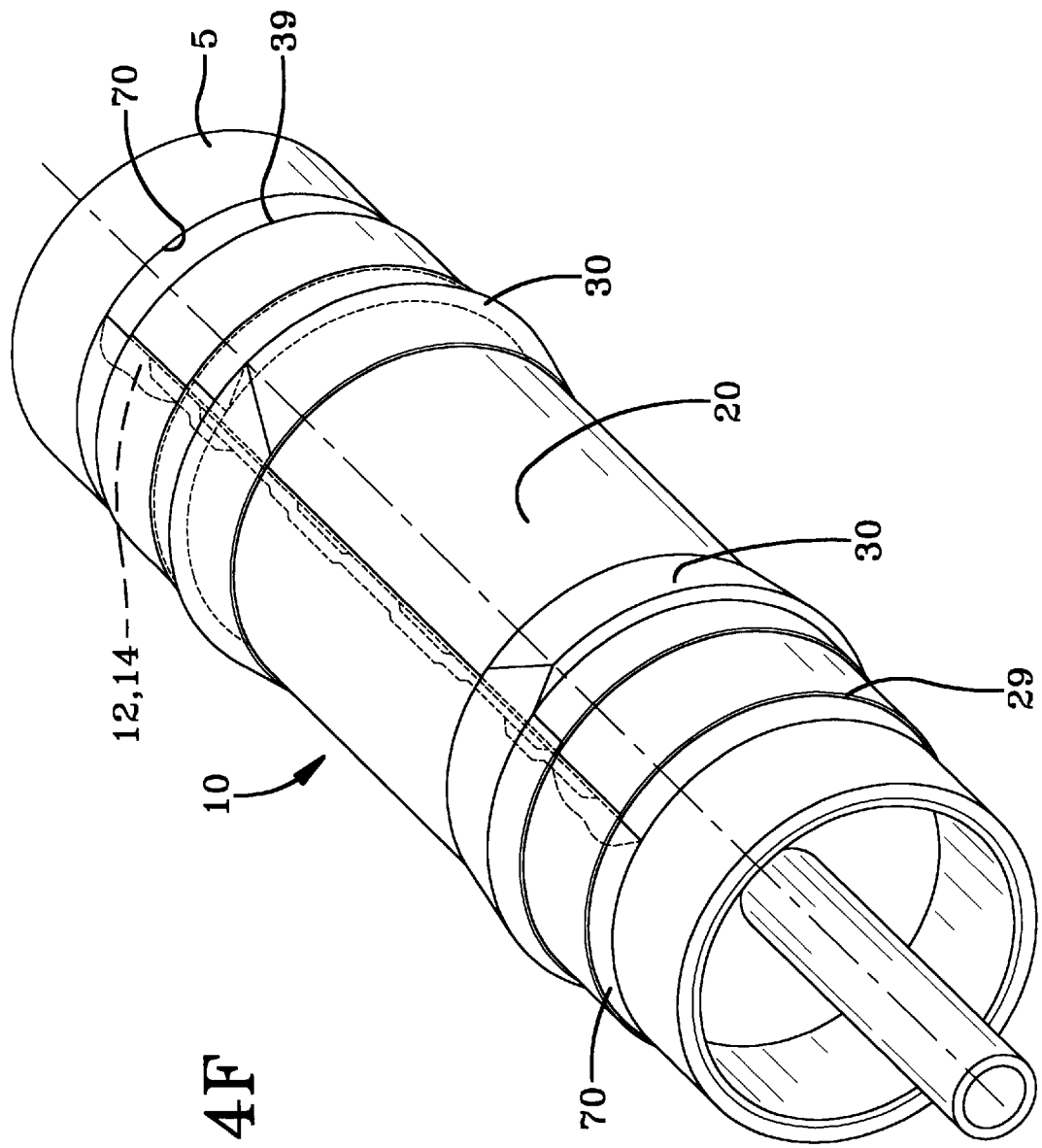

APPARATUS FOR BUILDING A LAMINATE AND FORMING A SUBASSEMBLY FOR A TIRE

This is a division of application Ser. No. 08/854,070, filed May 8, 1997, now U.S. Pat. No. 5,762,740, which is a Continuation-In-Part application under 35 U.S.C. §120, of prior application Ser. No. 08/572,929, filed on Dec. 15, 1995, now abandoned; and prior Divisional application Ser. Nos. 08/523,442 filed Sep. 5, 1995, now abandoned, and 08/556,475, filed Nov. 13, 1995, now abandoned, and Continuation-In-Part Ser. No. 08/692,890, filed Jul. 29, 1996, now abandoned, which is a continuation of application Ser. No. 08/369,192, filed on Jan. 5, 1995, now abandoned, of James Alfred Benzing, II, William James Head and Daniel Ray Downing for A METHOD AND APPARATUS FOR BUILDING A LAMINATE FROM AN ASSEMBLY OF TIRE COMPONENTS TO FORM A CASING.

BACKGROUND OF THE INVENTION

This invention relates to a method and apparatus for building a laminate 10A and in forming a subassembly 10 for a pneumatic tire from unreinforced tire components.

Historically, the pneumatic tire has been fabricated as a laminate structure of generally toroidal shape having beads, a tread, belt reinforcement and a carcass. The tire is made of rubber, fabric, and steel. The manufacturing technologies employed for the most part involve assembling the many tire components from flat strips or sheets of material. Each component is placed on a building drum and cut to length such that the ends of a component meet or overlap creating a splice.

In the first stage of assembly the carcass would include one or more plies, and a pair of sidewalls, a pair of apexes, an innerliner (for a tubeless tire), a pair of chafers and perhaps a pair of gum shoulder strips. Annular bead cores can be added during this first stage of tire building, and the ply or plies can be turned around the bead cores to form the "ply turnups."

The carcass components (excluding the bead cores) would be either "butt spliced" or "lap spliced." A butt splice has the component ends joined but not overlapped, a lap splice has overlapping ends.

This intermediate article of manufacture would be cylindrically formed at this point in the first stage of assembly. The cylindrical carcass is expanded into a toroidal shape after completion of the first-stage of tire building. Reinforcing belts and the tread are added to the intermediate article during a second stage of tire manufacture, which can occur using the same building drum or work station or at a separate shaping station.

During the expansion of the carcass, tensile stresses are imposed on the spliced and uncured components of the tire carcass.

In the case of automobile or light truck tires, lap splices were preferred because the splice remained intact whereas butt splices would tend to open or fail. Even with the good adhesion of the lap splice the cords adjacent the splice tended to be stretched compensating for the overlapped two layers of cords at the splice. This localized stretching creates a non-uniformity that is readily visible under x-ray, ultrasonic display or by physically cutting the tire and visually inspecting it.

The tire designer, in order to prevent the creation of tire uniformity problems has historically insured that the splices of the various layers of components were not circumferentially aligned. This non-alignment of splice joints was believed to improve the carcass overall durability and uniformity, as measured by the amount of force variation and the balance of the tire. Tire engineers also have believed that tire uniformity could be improved if these discontinuities were deliberately circumferentially spaced around the carcass. This meant that each component had to be applied to the ply at the tire building station where each component was cut and spliced in a spaced order.

A U.S. patent issued in 1917 taught the use of an apparatus to assemble strips to form a tire tread subassembly. U.S. Pat. No. 1,353,934 issued in 1917 teaches in order to create the strips of proper width and location the components were required to be trimmed at the apparatus. This tread subassembly included a cord reinforced belt and optionally could include a pair of sidewalls. This method of assembly required the sidewalls to be turned down upon assembly to a tire casing which one skilled in the art would readily appreciate is very difficult in that the unreinforced sidewall cannot conform to the compressive stresses of being turned radially inward without a high likelihood of localized buckling. This created tremendous non-uniformities in the tire and therefore has been heretofore abandoned as a viable method of tire assembly.

The subject matter of this patent application completely reverses this conventional wisdom as it relates to tire subassembly construction. The tire subassembly is manufactured with numerous unreinforced components being formed and adhered to a conveying carrier member or tire component without requiring any secondary trimming thus forming a laminate structure which can be wound onto rolls or spools for subsequent use at the tire building station. The laminate can then be cut using a novel cutting technique which results in a single splice line. The tire subassembly built according to the present invention can actually decrease the tire building costs while reducing splice-related non-uniformities.

In one embodiment of the invention, the subject matter of this patent application completely reverses this conventional wisdom as it relates to carcass construction. The carcass is manufactured with numerous components being formed and adhered to a conveying ply thus forming a laminate structure which can be wound onto rolls or spools for subsequent use at the tire building station. The laminate can then be cut using a novel cutting technique which results in a single splice line. The tire carcass built according to the present invention can actually increase the tire burst strength while reducing splice-related non-uniformities.

SUMMARY OF THE INVENTION

A method and apparatus 200 for building a laminate 10A from an assembly of unreinforced tire components suitable in forming a subassembly 10 for a pneumatic tire is disclosed. As used in this application, unreinforced means having no parallel cord reinforcement as is common in belts and plies.

The method in its simplest to explain form has the steps of providing an apparatus having a plurality of calender rollers, the apparatus being capable of simultaneously forming, positioning, attaching and conveying a plurality of continuous strips of elastomeric tire components each formed component having a predetermined cross-sectional profile formed by a component forming depression on a calender roller; and activating the apparatus simultaneously forming the plurality of continuous strips of elastomeric tire components and positioning and attaching each formed strip of tire components from the component forming depression of the calender roller to adjacent strips of tire components or a conveyor at the location where each formed strip of elastomeric components is formed as they are conveyed thus forming a laminate of unreinforced tire components, each component having a predetermined cross sectional profile formed by a component forming depression on a calender roller, suitable for use as a subassembly for a pneumatic tire.

The method of building this laminate 10A may have the following steps: conveying a carrier member 20, the carrier member 20 having a width ($W_c$), the width being measured at an angle perpendicular relative to the direction of conveyance; forming one or more of continuous strips of elastomeric tire components, the strips of tire components having predetermined cross sections, by an apparatus having a plurality of calender rollers, each formed component having a predetermined cross sectional profile formed by a component forming depression on a calender roller; and as the components are formed simultaneously attaching each of continuous strips of tire components from the component forming depresion or depressions of the calender roller to the carrier member or to another previously attached tire component at a precise lateral location while the carrier member and previously attached components are being conveyed, to form a laminate 10A having a width (W) perpendicular to the direction of conveyance.

The method preferably may also include the steps of tensioning the laminate 10A by winding the laminate directly onto a roll 210; cutting the laminate 10A parallel to the width (W) when a predetermined length of laminate 10A is wound into the roll 210; transporting the roll 210 of laminate 10A to a tire building drum work station; and cutting the laminate 10A to a predetermined length; and applying the laminate 10A to a tire building drum.

The method step of applying the plurality of continuous strips of tire components also preferably includes the step of pressing the conveying subassembly against the strips of tire components as they are being formed thereby affixing the components to the subassembly 10.

Preferably, the step of forming at least one of the continuous strips of tire components includes the step of calendering the component or components. Most preferably the step of forming the continuous strips of tire components includes the step of calendering a plurality of continuous strips of tire components of predetermined cross sections at spaced locations along the conveyed path. Each calender having at least one calender roller 350, 352 with a component forming depression 356, each depression 356 being precisely located relative to a perpendicular to the direction of conveyance.

The subassembly 10 may employ a carrier member 20, the carrier member being either a tire component or a sheet of material to which a majority of the components are directly or indirectly attached.

Most preferably the carrier member 20 can be a liner component, the liner component 50 being formed at the apparatus or alternatively can be supplied in rolls of unvulcanized material cut to a width ($W_L$).

Alternatively, the carrier member 20 can be a woven cloth or other roll of material which does not form a part of the finished tire but is simply used to facilitate the forming of the subassembly of unreinforced components into a laminate 10A. In such a case, the carrier member 20 can be a separation liner 11 or more preferably a roll of vulcanized rubber sheeting to which one surface of the components is adhered to as the components are formed, attached to another component in the process of building the laminate. In the case where the carrier member 20 does not form a part of the finished tire the method includes the step of removing the carrier member 20 from the laminate 10A prior to cutting the subassembly 10 to a length suitable for use in the tire.

The method further may include the step of stitching the conveying carrier member 20 to an inextensible conveyor belt 207, the conveyor belt 207 being laterally aligned relative to the component forming depressions of the rollers.

The method of forming the laminate 10A also may include the steps of extruding elastomeric material 25 for forming the continuous strip of tire components; and feeding the flow of extruded material 25 into the nip of calender rollers 350, 352. Alternatively, the extruder may include a die for directly establishing the cross sectional shape of the component and thus can extrude the shaped component directly onto the carrier member 20 at a precise lateral location along the carrier member's width $W_c$. This direct extruding can generate more scrap and accordingly is less desirable than the use of the component forming calender rollers.

In some cases the preferred method includes the step of splitting the flow of extruded material 25 into two flows 25A, 25B of extruded material into the nip of calender rollers 350, 352 each flow 25A, 25B supplying material to form a distinct tire component. This step is desirable where two similar components are needed to build the carcass subassembly 10 and one calender 302 can form both components simultaneously. For automated construction of the laminate 10A the method should also include the step of metering the flow of extruded material, the flow being controlled to match the outflow of calendered material.

When the method includes the step of winding the laminate 10A onto a roll 210 in the case where the carrier member 20 is an unvulcanized rubber component such as the liner 50, it preferably includes the step of applying a separation liner 11 to one side of the laminate 10A prior to winding the laminate 10A onto a roll 210.

In a preferred method for building a laminate 10A of tire components and for forming a tire subassembly 10 from the laminate 10A, the method has the following steps of: using a liner component 50 made of elastomeric material 24, as the carrier member 20, the carrier member 20 being a conveyor strip for itself and other linearally moving tire components, the other tire components being continuously formed and affixed to the carrier member 20 or another previously formed component to form a laminate 10A as the carrier member 20 moves along the path of its conveyance; then, cutting the laminate 10A into sections of predetermined lengths, each section having a pair of ends 12, 14, the respective cuts being along a cutting path across the entire width W of the laminate 10A; then, splicing the two ends 12, 14 of a cut section to one another to form a cylindrical tire subassembly 10; and then, applying one or more plies and shaping the tire assembly toroidally.

The apparatus 200 for building a laminate 10A from an assembly of tire components suitable for use in a pneumatic tire 100 is described below. The apparatus 200 has a means 204 for conveying the subassembly 10 and its tire components while the width of the subassembly and each component attached to the subassembly is oriented at an angle substantially perpendicular relative to the direction of conveyance; a means 300 for forming a plurality of continuous strips of elastomeric tire components, the strips of tire components being formed having predetermined cross sectional profile; and a means 502 for applying each of the formed continuous strips of tire components to one or more of the components of the subassembly 10 while the subassembly 10 is being linearally conveyed and as the continuous strips are being formed, thereby, to form a laminate 10A.

The apparatus 200 may further include a means 209 for winding the article onto a roll 210.

The means 300 for forming the continuous strips of tire components is preferably a plurality of calender assemblies 302. Each calender assembly 302 has two calender rollers 350, 352 and a means 360 for delivering processed elastomeric material 25 to a nip 354 radially above the two calender rollers 350, 352. The means 300 includes an extruder 360 for delivering processed elastomeric material 25.

The calender assembly 302 has a means 320 for laterally positioning the processed elastomeric material at a predetermined lateral location above the calender rollers 350, 352.

The apparatus 200 and method described above is capable of forming and assembling the various elastomeric tire components into a laminated subassembly 10. The laminated subassembly 10 is formed in an efficient and extremely precise manner which improves tire uniformity at lower manufacturing cost.

A method and apparatus 200 for building a laminate 10A and from an assembly of tire components suitable in forming a reinforced subassembly 10 the subassembly 10 being a carcass 10 for a radial ply pneumatic tire 100 is also disclosed. In this method, the ply material 20 is the carrier member 20 and performs that same function as described above.

The method of building a laminate 10A from an assembly of tire components suitable for use in forming a carcass 10 for a radial ply pneumatic tire 100 has the following steps: conveying a ply material 20, the ply material 20 being made of elastomeric material 24 reinforced by cords 22, the cords 22 being embedded in the elastomeric material 24 and being parallel, substantially equally spaced and oriented at an angle between 65° and 90° relative to the direction of conveyance; forming a plurality of continuous strips of elastomeric tire components, the strips of tire components having predetermined cross sections; and applying the plurality of continuous strips of 10 tire components to at least one side of the ply material 20, while the ply material 20 is being conveyed, to form a laminate 10.

The method preferably may also include the steps of winding the laminate 10A onto a roll 210; cutting the laminate 10A parallel to the cords 22 when a predetermined length of laminate 10A is wound into the roll 210; transporting the roll 210 of laminate 10A to a tire building drum work station; and cutting the laminate 10A to a predetermined length; and applying the laminate 10A to a tire building drum.

The method step of applying the plurality of continuous strips of tire components also preferably includes the step of pressing the conveying ply 20 against the formed strips of tire components thereby affixing the components to the ply.

Preferably, the step of forming at least one of the continuous strips of tire components includes the step of calendering the component or components. Most preferably the step of forming the continuous strips of tire components includes the step of calendering a plurality of continuous strips of tire components of different predetermined cross sections at spaced locations along the conveying ply 20.

The method further may include the step of stitching the conveying ply 20 to a conveyor belt 207.

The method of forming the laminate 10A also may include the steps of extruding elastomeric material 25 for forming the continuous strip of tire components; and feeding the flow of extruded material 25 into the nip of calender rollers 350, 352

In some cases the method includes the step of splitting the flow of extruded material 25 into two flows 25A, 25B of extruded material into the nip of 10 calender rollers 350, 352 each flow 25A, 25B supplying material to form a distinct tire component. This step is desirable where two similar components are needed to build the carcass 10 and one calender 302 can form both components simultaneously. For automated construction of the laminate 10A the method should also include the step of metering the flow of extruded material, the flow being controlled to match the outflow of calendered material.

The apparatus 200 for building a laminate 10A from an assembly of tire components suitable for use in forming a carcass for a radial ply pneumatic tire as described above.

BRIEF DESCRIPTION OF THE DRAWINGS

FIG. 2A illustrates an alternative use of the apparatus 200 whereby the carrier member 20 is a fabric or rubber sheet supplied from rolls 211 and all the formed components being attached to the carrier member 20 forming the laminate 10A which is wound onto rolls or spools 210.

FIG. 2B illustrates another alternative use of the apparatus 200 wherein the liner 50 is supplied to the apparatus 200 in sheets of a fixed width $W_L$ from large rolls or spools, the liner 50 previously being formed on a conventional calender as illustrated in FIG. 2C, cut to the width ($W_L$) and wound onto the rolls 211 with a separation liner 11 attached thereto. The liner 50, with the separation liner 11 removed, is fed into the apparatus 200 and the tire components are formed and simultaneously attached directly to the liner 50 the liner 50 being the carrier member 20.

FIGS. 3B–3G show the subassembly in various additional views.

FIG. 3H shows the subassembly 10 forming part of an unvulcanized carcass toroidally shaped after splicing.

FIG. 4 is a top view of one calender 302, a portion of the calender 302 being shown in cross-section.

FIG. 12A illustrates the ply material being calendered.

DEFINITIONS

Figure 1:
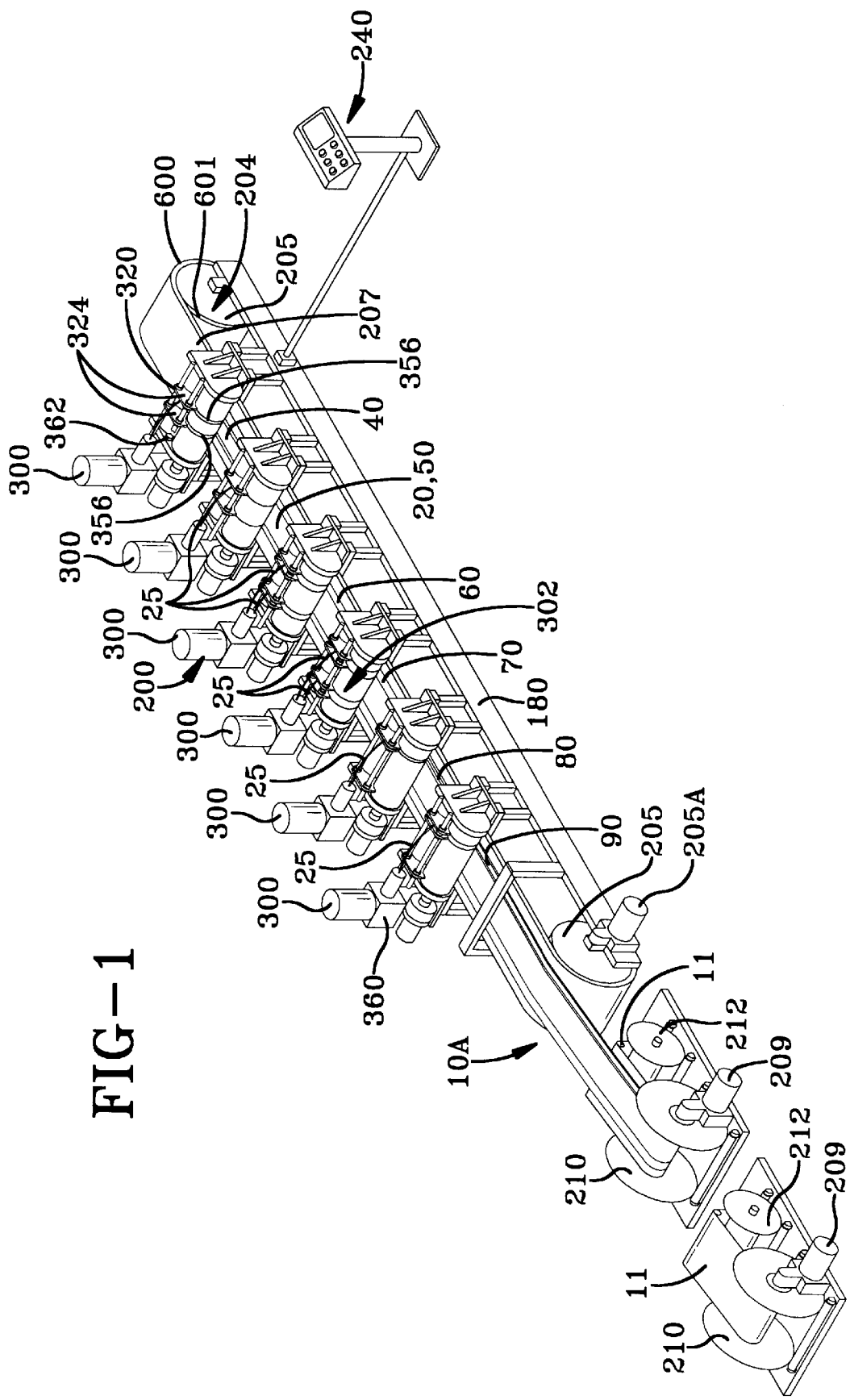
FIG. 1 illustrates a perspective view of one embodiment of the apparatus 200 made in accordance with the invention, the apparatus 200 illustrates the laminate 10A being formed by applying the formed tire components to the conveyor 207 or the liner component 50, the liner 50 formed at the apparatus 200 being utilized or performing the function of the carrier member 20 having the other formed components affixed thereto. After forming the laminate 10A, a separation liner 11 is attached and the laminate 10A can then be wound into rolls or spools 210.

"Apex" means an elastomeric filler located radially above the bead and interposed between the plies and the ply turnup.

"Axial" and "axially" means the lines or directions that are parallel to the axis of rotation of the tire.

"Bead" means that part of the tire comprising an annular tensile member wrapped by ply cords and shaped, with or without other reinforcement elements such as flippers, chippers, apexes, toe guards and chafers, to fit the design rim.

"Belt Structure" or "Reinforcing Belts" means at least two annular layers or plies of parallel cords, woven or unwoven, underlying the tread, unanchored to the bead, and having both left and right cord angles in the range from 17° to 27° with respect to the equatorial plane of the tire.

"Carcass" means an unvulcanized laminate of tire ply material and other tire components cut to length suitable for splicing, or already spliced, into a cylindrical or toroidal shape. Additional components may be added to the carcass prior to its being vulcanized to create the molded tire.

"Casing" means the tire carcass and associated tire components excluding the tread.

"Chafers" refers to narrow strips of material placed around the outside of the bead to protect cord plies from the rim, distribute flexing above the rim, and to seal the tire.

"Circumferential" means lines or directions extending along the perimeter of the surface of the annular tread perpendicular to the axial direction.

"Cord" means one of the reinforcement strands of which the plies in the tire are comprised.

"Equatorial Plane (EP)" means the plane perpendicular to the tire's axis of rotation and passing through the center of its tread.

"Innerliner" means the layer or layers of elastomer or other material that form the inside surface of a tubeless tire and that contain the inflating fluid within the tire.

"Insert" means an elastomeric member used as a stiffening member usually located in the sidewall region of the tire.

"Ply" means a continuous layer of rubber-coated parallel cords.

"Radial" and "radially" mean directions radially toward or away from the axis of rotation of the tire.

"Radial Ply Tire" means a belted or circumferentially-restricted pneumatic tire in which the ply cords which extend from bead to bead are laid at cord angles between 65° and 90° with respect to the equatorial plane of the tire.

"Shoulder" means the upper portion of sidewall just below the tread edge.

"Sidewall" means that portion of a tire between the tread and the bead.

"Subassembly" means an unvulcanized assembly of laminated unreinforced tire components to which a cord reinforced ply or plies and other components can be added to form a tire carcass.

"Tread" means a rubber component which when bonded to a tire carcass includes that portion of the tire that come into contact with the road when the tire is normally inflated and under normal load.

"Tread Width" means the arc length of the tread surface in the axial direction, that is, in a plane parallel to the axis of rotation of the tire.

DETAILED DESCRIPTION OF THE PREFERRED EMBODIMENT

Referring the FIGS. 1, 2A and 2B there are illustrated three exemplary uses of the apparatus 200 for building a laminate 10A from an assembly of tire components suitable for use in a pneumatic tire. The apparatus 200 and the alternative methods of using it are disclosed after a discussion of the laminate 10A.

The preferred embodiment of the invention is a laminate 10A as illustrated in FIG. 3A, 3B, 3C, 3D, 3E and 3F which is formed as a substantially flat composite structure having many tire components attached and adhered to each other thus forming a laminate or tire subassembly, the laminate and the subassembly being referenced by numeral 10A and 10 respectively. It is understood that in all cases the laminate 10A and the tire subassembly 10 are identical in construction except in the case where a carrier member is used and the carrier member 20 is not to be part of the subassembly 10. In that case, the carrier member 20 is removed prior to cutting the laminate 10A and is no longer part of the subassembly 10 used to build a tire. Thus, for simplicity in describing the invention the subassembly and the laminate are similarly identified by the reference numerals 10 and 10A respectively.

As shown all of the components are either sheets or strips of material of substantially the same length. Each component shown is precisely located laterally relative to one another. This laminate 10A is described in co-pending patent application Ser. No. 08/573,341 entitled "AN UNVULCANIZED UNREINFORCED SUBASSEMBLY FOR A TIRE CASING" which is incorporated herein by reference.

Figure 3A:
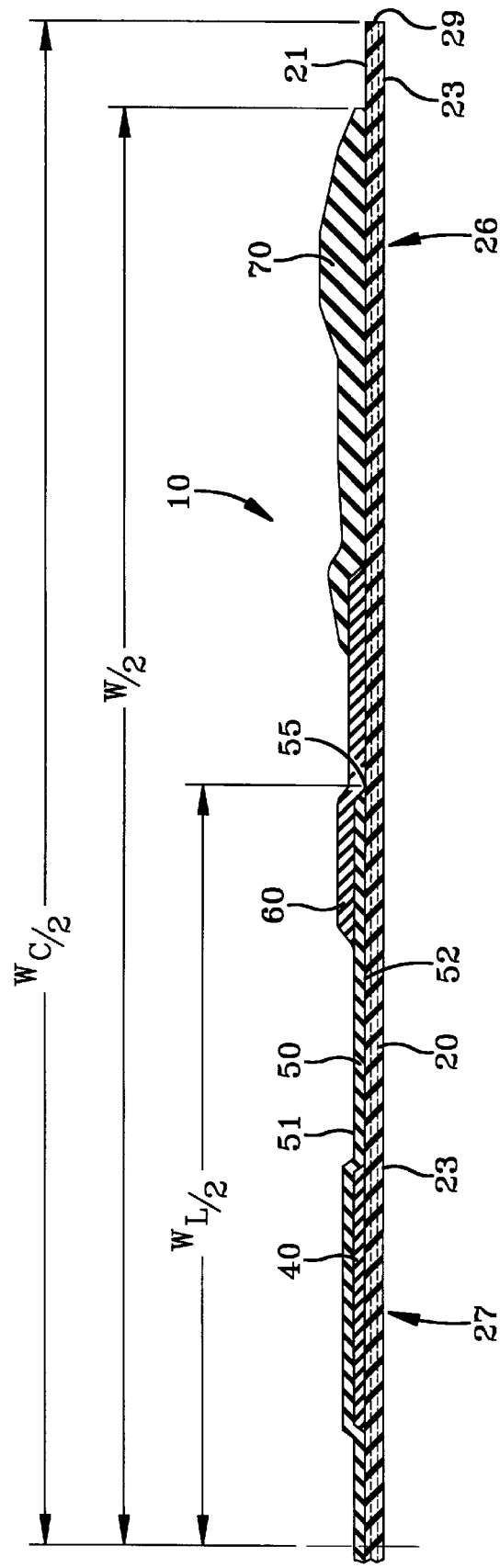
FIG. 3A illustrates in cross section one half of the laminated preferred embodiment subassembly 10 prior to being formed cylindrically upon a tire building drum, the building drum not illustrated. The opposite half of the subassembly 10 not illustrated generally but not necessarily is identical to the illustrated portion.
Figure 3B:
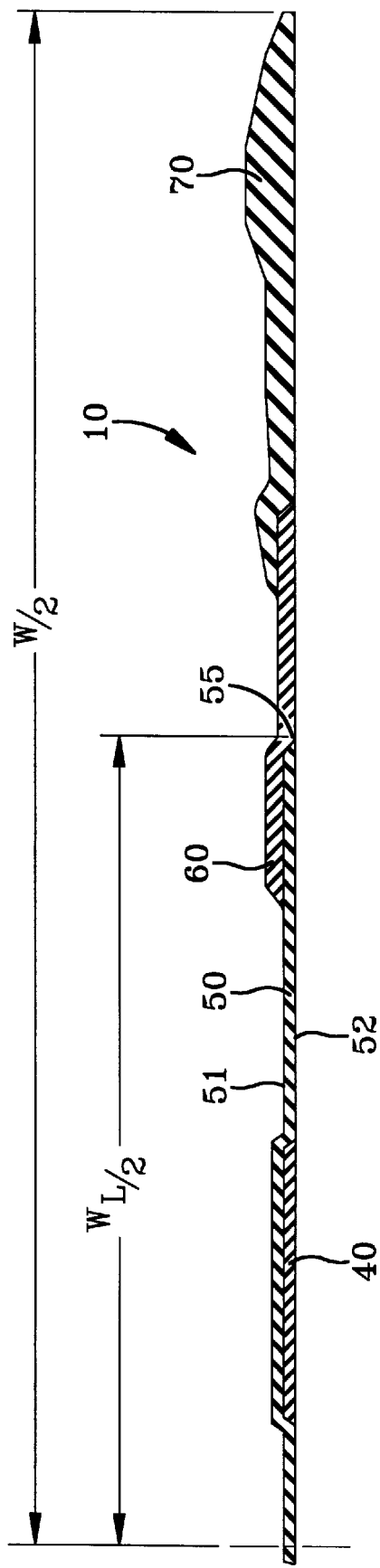

FIG. 3A depicts a carrier member 20, the carrier can be a fabric or a vulcanized rubber sheet, more preferably the carrier member 20 can be substituted for or eliminated by the liner component 50 formed on the apparatus 200 as shown in FIG. 1 or supplied in rolls 211 to the apparatus 200 as in FIG. 2B. The carrier 20 is not specifically identified in FIGS. 3B through 3G; it can be assumed that the carrier member has been removed or is replaced by the liner component 50. As shown in FIG. 3A, the member 20 has a first outer and second inner surface 21, 23 and a pair of lateral edge portions 26 located at the lateral extremes 29 of the member 20 all the subassembly tire components being located inward of the lateral edges 29.

When the liner 50 is employed as or replaces the carrier member 20 as shown in FIGS. 1 and 2B, components such as shoulder gum strips 40 can be attached to the second surface or side 52 of the liner component either by forming the shoulder gum strip 40 first and affixing them to the conveyor 207 then forming the liner 50 and simultaneously applying the liner to the strips overlaying the strips 40, each component being precisely located on the conveyor 207 such that the shoulder gum strips 40 are precisely laterally positioned relative to the liner edges 55, as shown in FIG. 3A, alternatively, the liner 50 can be inverted and the shoulder gum strips 40 attached to the second surface 52 just prior to being wound onto large spools 210 as shown in FIG. 2B.

The alternative method of construction shown in FIG. 2A involves the use of a carrier member 20 which can be a fabric or vulcanized rubber sheet or any type of reinforced or unreinforced sheet stock which need not actually be part of the finished tire but simply facilitates the assembly of the tire casing subassembly 10. In such a case the width ($W_c$) of the carrier member is preferably greater than the overall width (W) of the laminate 10A.

In an earlier patent application applicants disclosed the use of unvulcanized ply stock to perform the function of a carrier member 20. In that application Ser. No. 08/299,943 entitled "A PNEUMATIC TIRE AND AN UNVULCANIZED CARCASS AS AN INTERMEDIATE ARTICLE IN ITS MANUFACTURE," the reinforced ply member did become part of the tire. This was made feasible by employing a unique cutting method. In this application a unique cutting method disclosed in patent application Ser. No. 08/279,943 entitled "A METHOD AND APPARATUS FOR CUTTING OF ELASTOMERIC MATERIALS" is preferably employed to achieve the tire uniformity benefits, however, many of the manufacturing efficiencies can be achieved regardless of the cutting method employed.

The reader is directed to the following description of the laminate 10A bearing in mind that the liner component 50 can be substituted as the carrier member 20 accordingly, it being understood that when doing so, the liner 50 is performing the function of the carrier member 20.

With reference now to FIG. 3A, axially inward of the lateral edge portions 26 and attached to an outer surface 21 of the member 20 is a pair of shoulder gum strips 40. The shoulder gum strip acts as a rubber reinforcement in the shoulder portion 27 of the tire casing subassembly 10.

A liner component 50 is attached to the member 20 and over the shoulder gum strips 40. The liner 50 creates an air impervious barrier for the radially inner air chamber of the tubeless type tire. These liners are generally made of Halobutyl rubber. The liner 50 has an axial width $W_L$ equal to or narrower than the width $W_c$ of the carrier member 20. The liner width $W_L$ is sufficient to traverse axially outward of the beads when the tire is formed thus forming an air tight chamber between the tire and the wheel upon assembly. The liner has a first surface 51 and a second surface 52.

A chafer component 60 is shown at each lateral end 55 of the liner 50. The chafer 60 is attached to the liner 50, and to the outer surface 21 of the carrier member 20 and is slightly overlapped by a sidewall component 70 which is added after the chafer 60. The chafer 60 is positioned axially to provide a tough rubber reinforcement between the tire 100 and the rim flange of the wheel and is accordingly located in the bead region of the finished tire.

A sidewall component 70 is shown attached to the carrier member 20 and slightly overlapping the chafers 60 and extends laterally outward of the lateral ends 55 of the liner 50.

Optionally, to build an outlined white letter tire or a whitewall tire, a whitewall strip 80 and a cover strip 90 may be added to the laminate 10A as shown in FIG. 1 and FIG. 2A. Additionally, inserts 31 may be added in the sidewall region of the subassembly. This is particularly useful in run-flat tire construction and is shown in FIG. 2B.

The above description of the laminate 10A includes most of the unreinforced elastomeric components required to build a tubeless tire and it is considered to be the best mode of practicing the invention because it is a most efficient method to produce such a subassembly 10.

Additionally, it is considered within the scope of the invention that the laminate 10A may be built to include one carrier member 20 and at least any two of the unreinforced components selected from the groups of components used in the manufacture of tires. Preferably all the laminated components when cut to length form an individual subassembly 10 having the unique common splice feature as achieved in co-pending patent application Ser. No. 08/299,943 entitled "A METHOD AND APPARATUS FOR CUTTING OF ELASTOMERIC MATERIALS" which is incorporated herein by reference.

Prior to cutting the laminate 10A, the carrier member 20 when not part of the tire construction is removed and rewound onto spools 211. When the liner 50 is employed as the carrier member the entire laminate 10A is cut. The following describes the preferred method of cutting and splicing the subassembly 10 as further illustrated in FIGS. 3B through 3G.

Figure 3C:
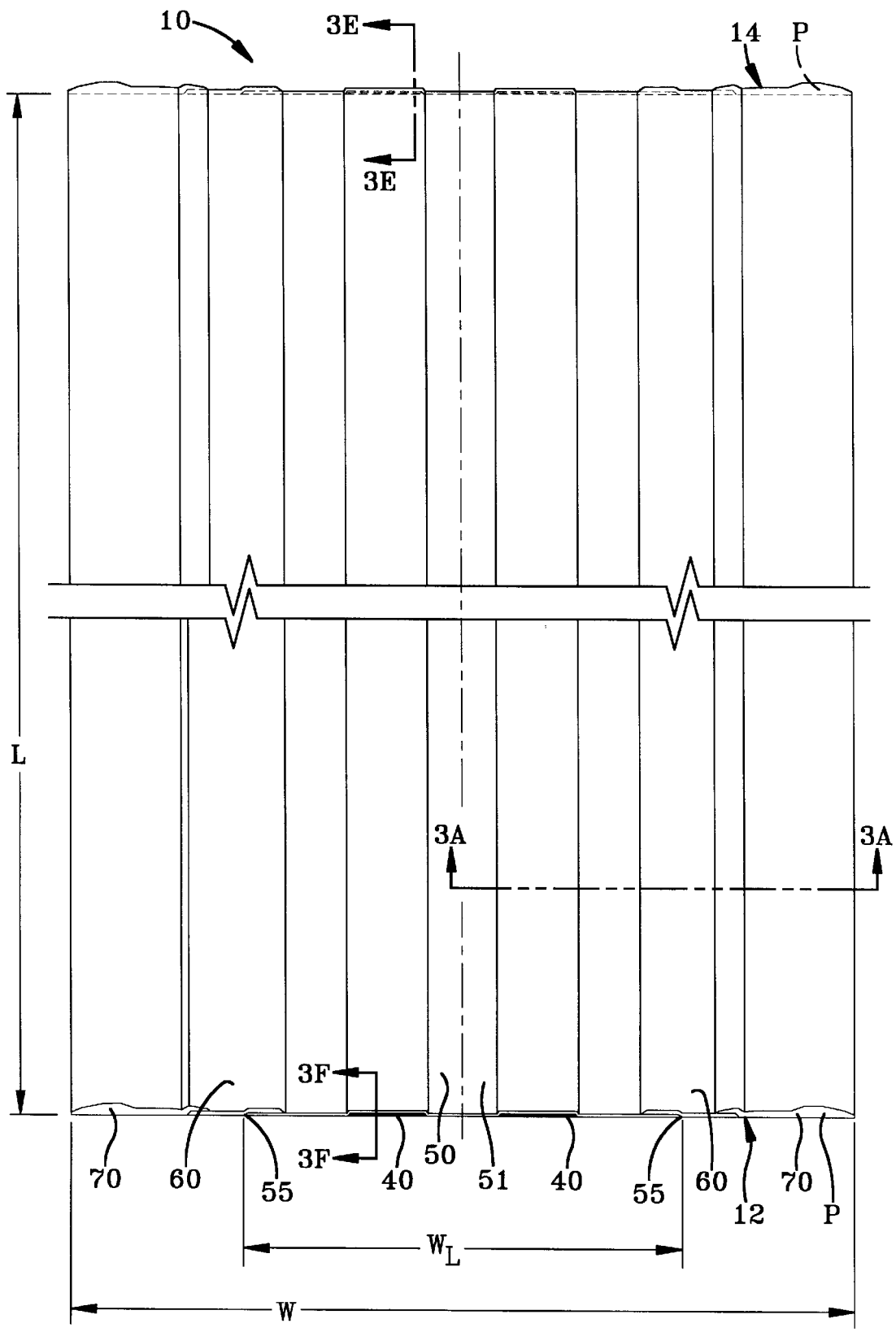
Figure 3D:
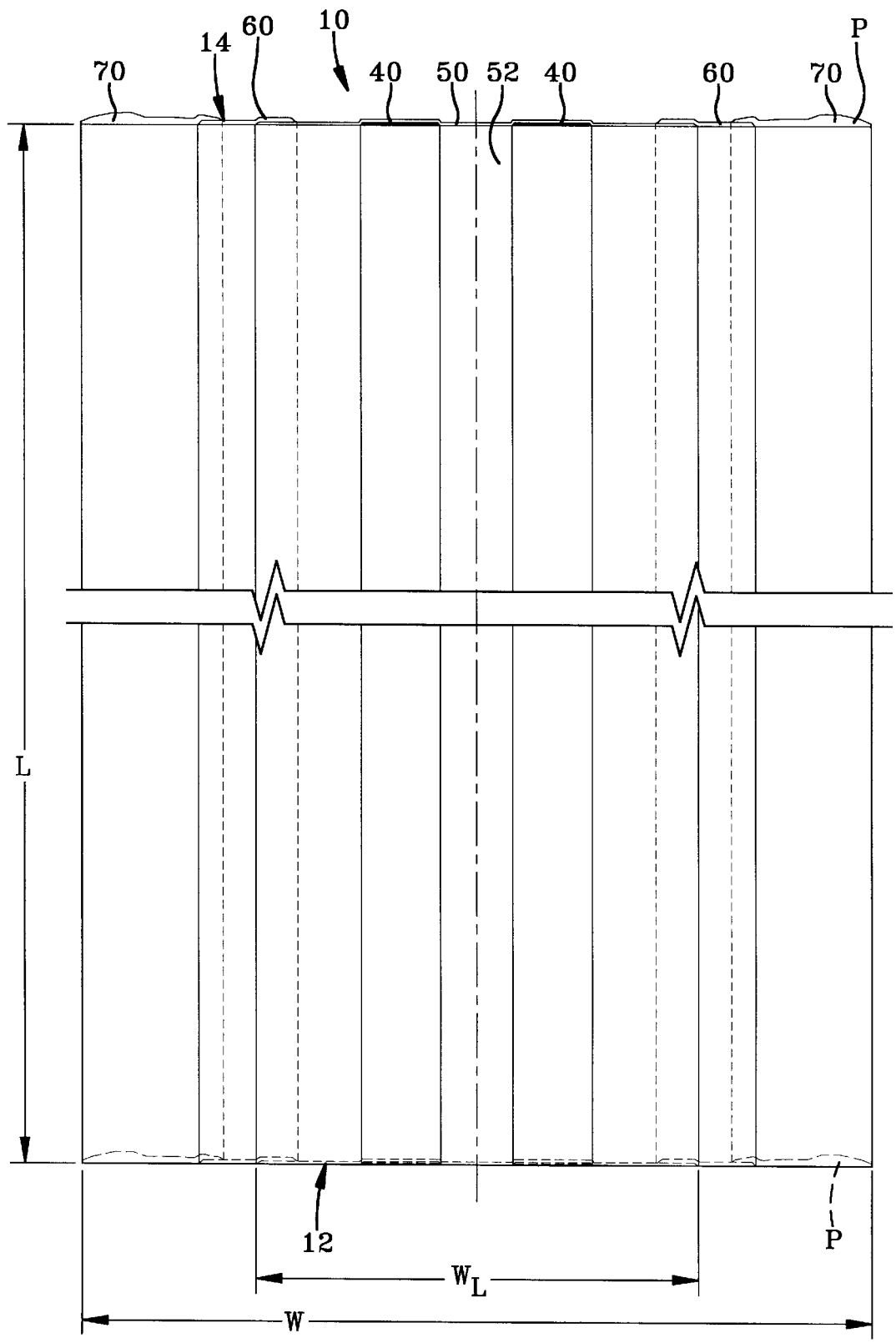
Figure 3G:
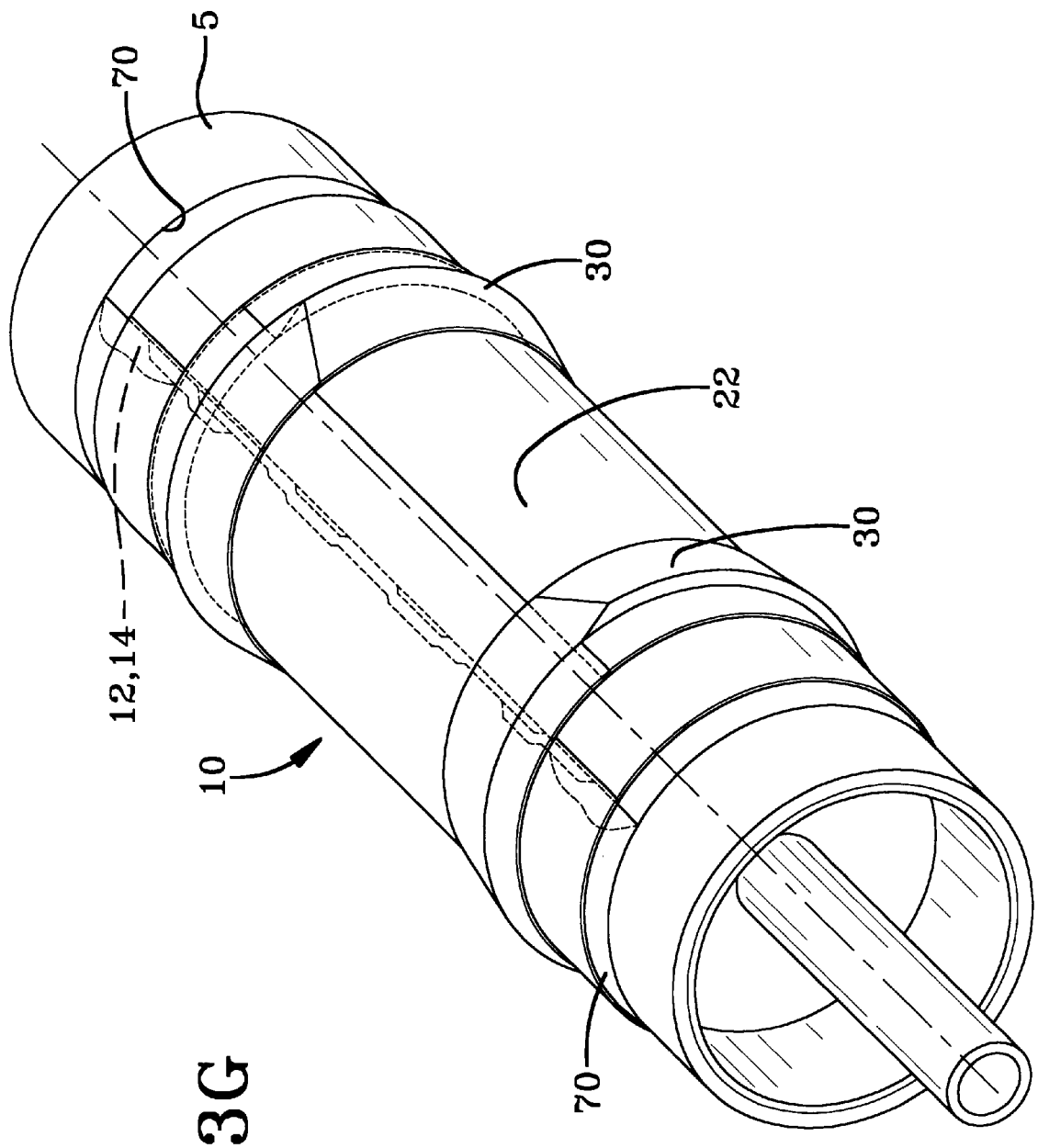
Figure 5:
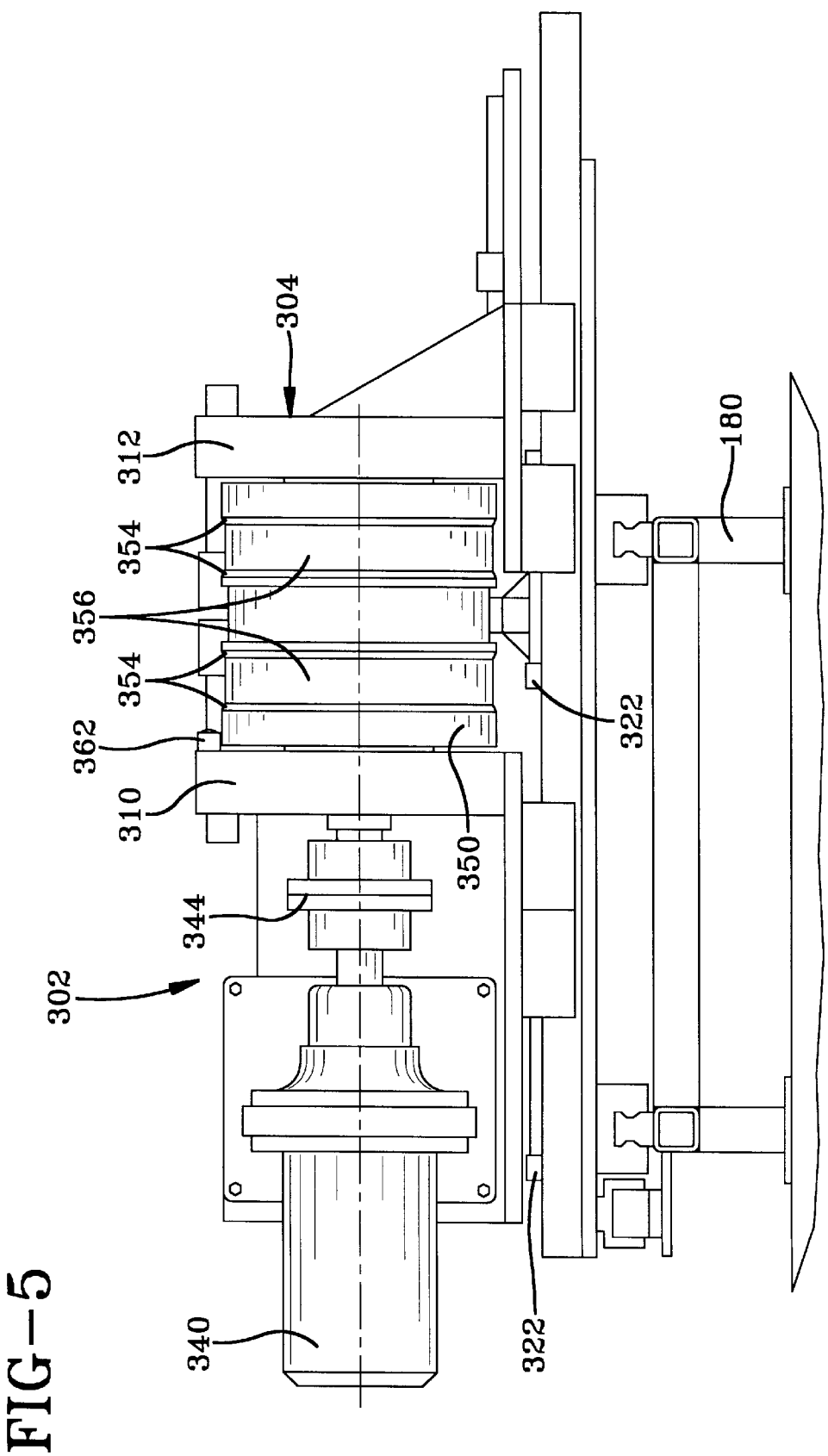
FIG. 5 is a front view of the calender 302 taken along lines 5—5 of FIG. 4.

FIGS. 3C and 3D depict the first end 12 and second end 14 respectively of the tire casing subassembly 10. As illustrated, both ends 12, 14 are cut along an axial or lateral extending substantially straight line path substantially parallel to the width (W) of the laminate 10A yielding a shortest possible cut. Alternatively, the cut ends 12, 14 can be obliquely cut relative to the width (W) of the laminate creating a straight line cut on a bias angle. These straight line cuts create a first end or surface area 12 and a second surface area 14. As shown in FIGS. 3E and 3F the surface areas 12 and 14 are lying in a substantially flat plane (P) and are inclined at an angle θ less than 90° relative to a normal plane (NP), the normal plane (NP) being perpendicular to the laminate 10A. In this application the preferred embodiment has the angle θ being about 80°. This high angle of inclination provides a large surface area of adhesion when the two ends 12, 14 are spliced at the building drum 5 as shown in FIG. 3G.

The laminate 10A when manufactured as shown in FIGS. 1, 2A or 2B can be made into continuous rolls 210. The laminated material 10A is then, in its preassembled state, stored in large rolls 210 which when sent to a tire building station is cut into sections of a precise length (L) by the unique cutting apparatus. The cut to length subassembly 10 is formed into a cylindrical shape as shown in FIG. 3G to which, at least one ply 22, a pair of apexes 30 and bead cores 120 are attached. After forming the turnups, by rolling the ply turnup, sidewalls and the chafers axially inward over the beads the tire carcass is toroidally shaped as shown in FIG. 3H effectively stretching the sidewalls radially outwardly creating an unvulcanized tire carcass.

Having described the laminate 10A, the readers attention is referred back to FIGS. 1, 2A and 2B for a description of the unique apparatus 200 used to form the laminate 10A. The apparatus 200 of FIG. 1 is substantially the same as the apparatus 200 of FIGS. 2A and 2B with the exceptions that the apparatus 200 of FIGS. 1 and 2B uses either freshly formed liner 50 or rolls of unvulcanized liner 50 as the conveying carrier member 20. The apparatus 200 includes a calender assembly station 300 to apply a pair of elastomeric shoulder strips 40 to one side 23 of the conveyed carrier member 20. The shoulder strips are attached to a second side 52 of the liner 50 opposite to other tire components which are adhered to the first side 51 therefore the conveyed laminate 10A can be reversed in orientation to facilitate applying the formed shoulder strips 40 as shown in FIG. 2B or alternatively formed first and affixed to the conveyor 207 prior to forming the liner 50 and overlaying the liner 50 onto the conveyor 207 and shoulder strips 40 as shown in FIG. 1. The result in either method is that the shoulder gum strips 40 are attached to the liner 50 on a side 52 opposite the other components.

In the method of practicing the invention as shown in FIG. 2B the roll 211 of carrier material 20 is the liner 50 which is formed by conventional calendering means 202 illustrated in FIG. 2C and then cut to width. The cut liner stock 50 is spliced together forming lengths of material which are placed onto the roll 211, as shown in FIG. 2B. These full rolls of liner 211 are placed at one end of the apparatus 200. The rolled liner material 50 may have a woven separation liner 11 attached to one side 52 of the liner. The operator attaches the separation liner 11 to a motor 209 driven windup spool 212 and he stitches the liner material 50 to a conveyor means 204 after feeding the liner material 50 through a pair of lateral position sensors 214 which monitor the alignment and position of the lateral edges 55 of the liner material 50. The conveyor means 204 has two large rotating drums 205 attached to a rigid frame 180. Wrapped over the drums is a conveying belt 207. The endless conveying belt 207 is preferably inextensible and made of stainless steel material. The output end of the apparatus 200 has the rotation drum 205 driven by a variable speed motor 205A.

A means 330 for stitching the liner 50 to the conveyor 207 is shown. The means 330 for stitching as shown is a pair of rollers 330A, 330B. Alternatively, the mean for stitching may be any device that applies pressure to the liner material 50 affixing it to the belt 207, such devices can include individually spring loaded roller bearings aligned in multiple rows.

The conveyed liner material 50, with the width ($W_L$) oriented at an angle perpendicular relative to the direction of conveyance, stitched to a conveying belt 207, is moved at a predetermined speed past a plurality of means 300 for forming one or more continuous strips of elastomeric tire components, the strips of tire components each having a predetermined cross section formed by a component forming depression machined into one of the colander rollers 350, 352

The means 300 for forming the tire components preferably has a plurality of calender assemblies 302.

Figure 9:
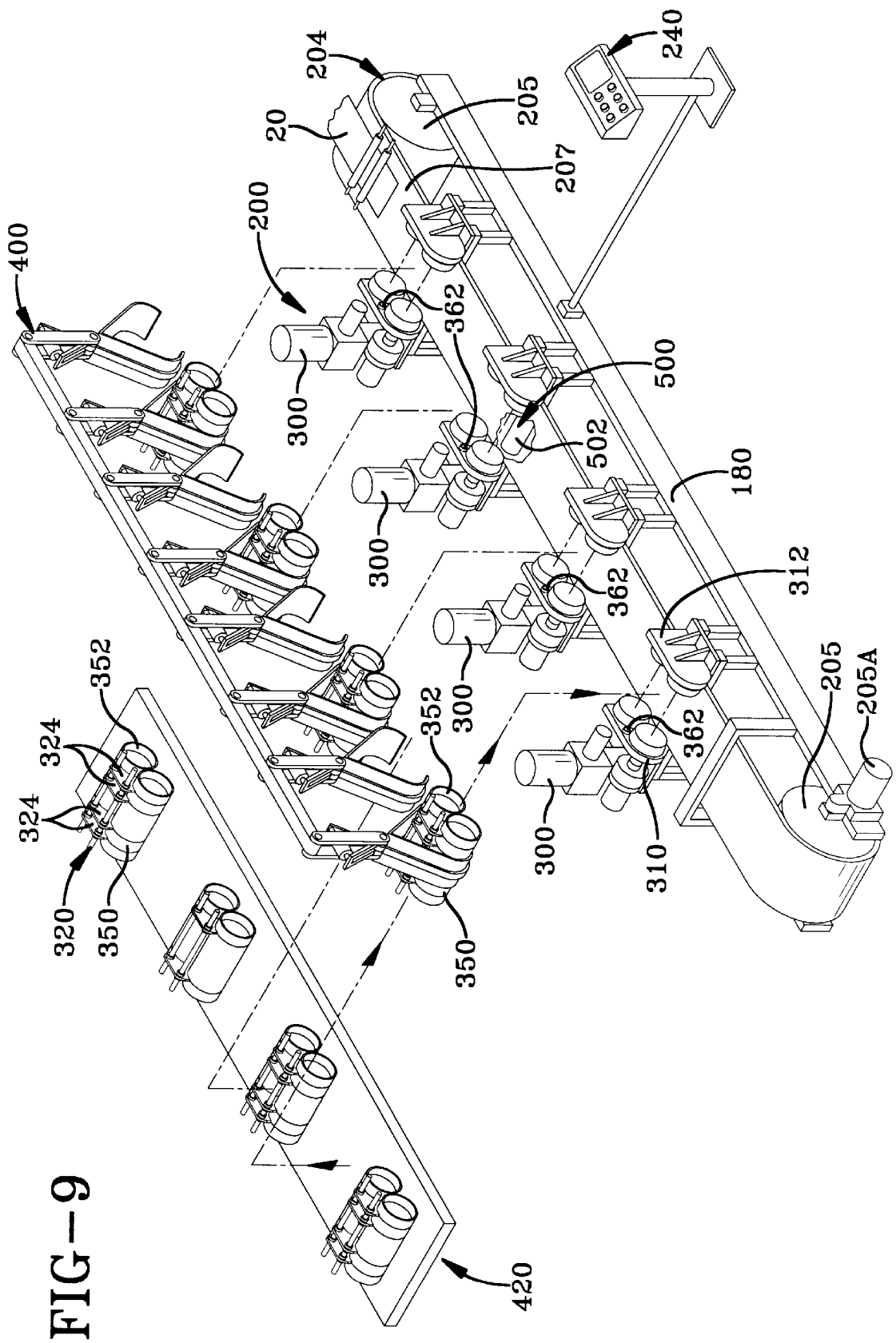
FIG. 9 is a perspective view of a roller transfer mechanism 400.

While forming the tire components the apparatus 200 includes a plurality of means 502 for applying the formed components directly onto at least one side 21 or 23 of the conveying carrier material 20 or to one side 51, 52 of the liner member 50 when functioning as the carrier member 20 as shown in FIG. 9. The means 502 for applying the tire component is a roller commonly referred to as a pinch roller mechanism. One roller 502 is placed under the conveyor 207 and applies pressure between the conveying material 20 and the formed component at each calender thus insuring the component transfers to the conveying laminate 10A. Under the belt is a means 600 for laterally positioning and guiding the belt 207. The belt 207 has a pair of guide rails 601 adhered to the underside. One rail 601 at each of the lateral edges of the conveyor belt 207. The guide rails 601 are precisely located laterally by the conveyor drums 205. The guide means 600 are fixed laterally by the pairs of rollers 205. One roller 205 being at each end of the conveyor. The continuous guide rails 601 closely pass between the pinch rollers 502 also preventing the conveyor 207 from wandering laterally and further insuring the lateral location of the belt 207 relative to component forming depressions 356. Thus insuring positive and accurate placement of the formed component. The formed laminate 11A with all tire components assembled can then be cut to a length suitable for building a tire subassembly 10 or as illustrated in FIG. 1 the laminate 10A can have a separation liner 11 attached to one side of the laminate 10A and be wound onto a large roll 210 or spool. The large roll 210 as shown is driven by a motor 209 to facilitate winding the laminate 10A onto roll 210. As illustrated each roll 210, 211 or spool 212 is placed on a pair of rollers. Alternatively, each roller may have an axle which is supported and may be motor driven to accomplish what is shown in FIG. 1. When a sufficient amount or a predetermined length of the laminate 10A is wound onto a roll, the laminate 10A is cut preferably parallel to the width (W).

During the procedure of cutting the roll 210 of laminate 10A it is recommended that a duplicate laminate back up station or roll 210 be provided so that the apparatus 200 can either continue forming the laminate 10A or at least to minimize the stoppage of the machine for carrier member roll 211 and laminate roll 210 changing.

Similarly, as illustrated in FIGS. 2A and 2B the supply of rolls 211 of material are best handled by having aligned rolls 211 of stock available to keep the apparatus 200 in a constant supply of material.

This may require the employment of a conventional overhead conveyor positioned between the apparatus and the first roller 210 or 211 to facilitate roller changeover, the overhead conveyor not illustrated.

Once a laminate roll 210 is full it can be transported to a storage area or directly to a tire building work station. Once at the tire building station the subassembly 10 can be cut into sections of a predetermined length and applied to the tire building drum 5 as shown in FIG. 3G.

With reference to FIG. 4, a detailed view of a calender assembly 302 is shown. In the preferred embodiments of the invention the apparatus includes a plurality of calender assemblies 302. Each calender assembly 302 is fundamentally the same as the next or adjacent one with the exception of the pair of calender rollers 350, 352.

Each calender assembly 302 represents a means for forming an elastomeric strip or strips of tire components. Preferably each calender 302 includes a means 360 for delivering processed elastomeric material 25 to the nip 354 of the two calender rollers 350, 352, the nip 354 being between the two calender rollers. The means 360 for delivering processed elastomer material 25 as shown is an extruder, preferably each apparatus 200 includes at least one such extruder 360, more preferably each calender assembly 300 includes one extruder 360.

The calender assembly 302 has a means 320 for laterally positioning the processed elastomeric material 25 at a predetermined lateral location above the calender rollers 350, 352. The means 320 for positioning as shown in FIGS. 1, 2A and 2B are called plows 320. At least one pair of plows 320 is laterally positioned at a predetermined location radially above the pair of calender rollers 350, 352. Each plow 320 has two rigid members 324 contoured to precisely fit above and between the two rollers. Preferably each plow rigid member 324 is placed laterally adjacent to a lateral end 354 of a component forming depression 356 located on one or both of the calender rollers 350, 352. This positioning of the plows 320 secures and provides lateral support while preventing an overflow of calendered material from forming and adhering to the conveying carrier material 20.

The lateral position of the component forming depressions 356 are precisely located relative to the conveyor belt 207 of the apparatus 200. This insures that each component as it is formed is aligned and affixed to the conveying carrier member 20 or the liner 50 and the previously formed and attached components at a precise lateral location relative to the components to which it is being attached. The precise lateral positioning insures that each component is properly located and enables minimal material variation to be achieved while also reducing the relative size of each component due to tolerance variations that occurred in the prior art method of assembly.

The extruder 360 feeding processed material 25 to a pair of calender rollers 350, 352 can be provided with a single feed source to produce one component such as the liner 50. However, when two similar components such as the gum shoulder strips 40, or the sidewalls 70, or the chafers 60 are being formed, the extrudate can be split into two flow paths. One flow path feeding each component forming depression 356 as shown in FIGS. 1 and 2A.

In order for the apparatus to function automatically, a means 362 for sensing and metering the flow of extrudate to the calenders must be provided. The means can simply be a sensor used in combination with the valving of the flow or the speed of the extruder or both. Nevertheless, it is believed preferable that the extruded material delivered to the calenders be monitored and controlled.

As shown in FIGS. 1 and 2A a sensor can be provided in each calender assembly station, the sensors connected to a control panel 240 which can automatically adjust the flow of extrudate at a given station 300. The sensors 362 can be individual video cameras which send a picture back to a monitoring computer at the control panel 240. As shown, the sensor is a video camera and the plows 324 are transparent for viewing through. Alternatively, the video sensor could be relocated if the plows were not transparent. Alternatively, the sensors 362 can be strain gauges or pressure transducers located in or on the plows 324 which relay information to the controller, which in turn regulates the material flow to the nip of the respective calender rollers by adjusting either the speed of the extruder or by diverting the material flow.

As shown in FIGS. 4 through 8 each calender assembly 302 has two calender rollers 350, 352, one roller being the transfer roller, the other being the follower roller 352. Each roller 350, 352 is a hollow generally cylindrical structure opened or tapered at each end 357, 358 and having an axis of rotation R.

The calender assembly 302 has a means 304 for supporting the two calender rollers. The means for supporting the rollers has a first end 310 and a second end 312. The first end 310 and the second end 312 each have a pair of rotatable hubs 314, 316, one hub 314, 316 fitting into each end 357, 358 of the roller 350, 352. The pair of hubs 314, 316 for fitting into a roller have an axis of rotation $R_H$ coincident with the axis of rotation R of the roller. Each hub 314, 316 is conically tapered at an angle $\alpha$ of about 6°. The cylindrical rollers 350, 352 are similarly tapered so that upon assembly the fitment is secure so that no slippage occurs that might create a non-uniformity in the formed component. Additionally, slippage prevention can be achieved by using a pin and a slot to fix the rollers.

As further illustrated in FIG. 4 each calender assembly 302 has at least one, preferably two motors 340, 342, a drive shaft or coupling 344 powered by each motor, the drive shaft being connected to a rotatable hub 314, the hub 314 providing rotational movement of one of the calender rollers 350 or 352.

Although one motor 340 is sufficient to drive one roller 350 it is believed preferable to have two variable speed motors 340, 342, one motor driving each roller 350, 352. The first motor 340 being connected to a roller 350 called the transfer roller 350 is synchronized to match the linear conveyor belt 207 speed so that the formed tire component can be applied to the conveying ply material 20 at about the same rate of speed at which the component is being formed, or possibly at a slightly different speed.

The second motor 342 is connected to the roller 352 called the follower roller 352 and it provides rotational movement at a speed of about 95% that of the first motor 340. This differential speed of the rollers 350, 352 insures that the calendered component always adheres to the conveying member 20 as opposed to attaching itself onto the following roller 352.

Figure 6:
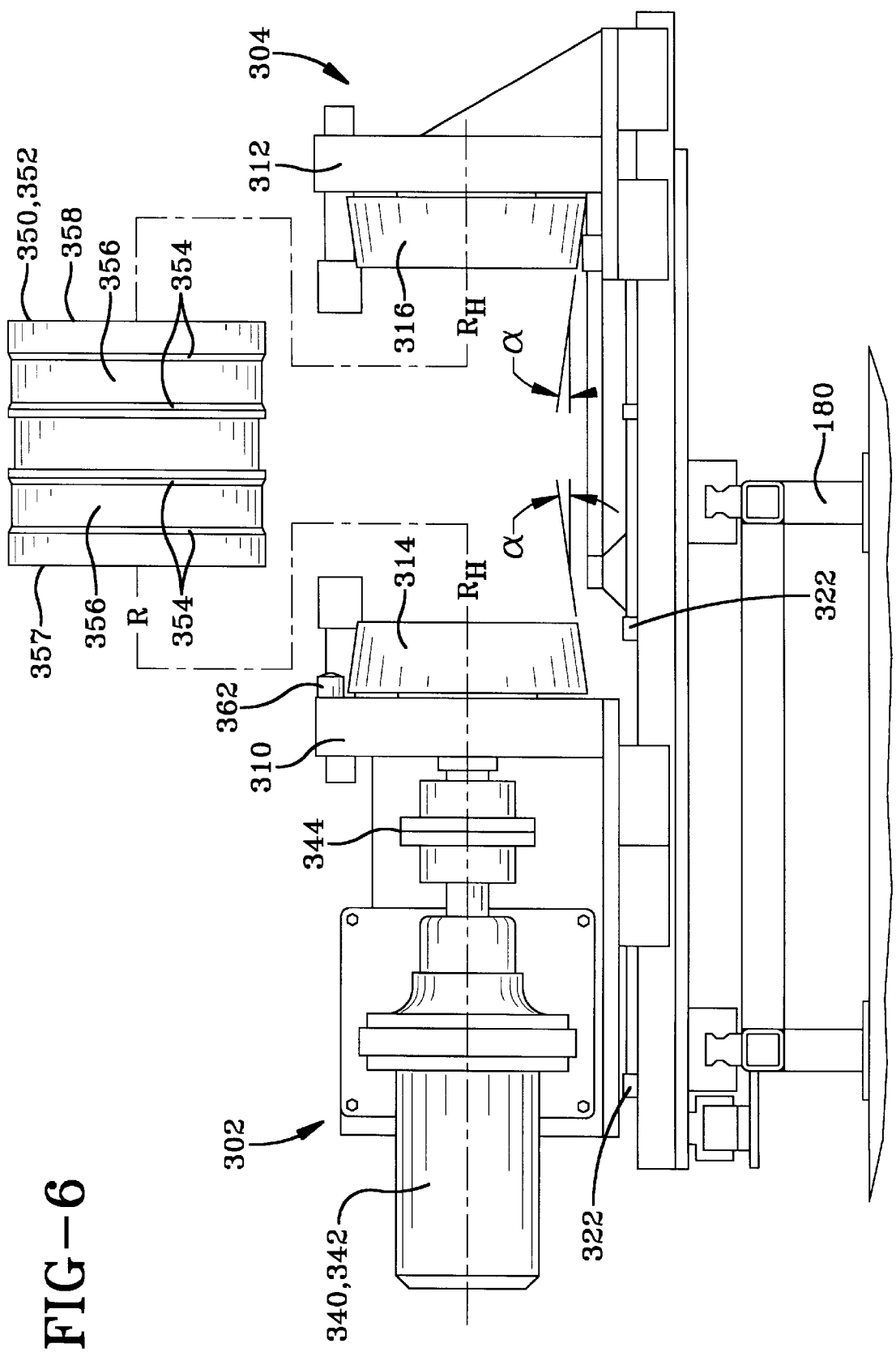
FIG. 6 is an front view of the calender 302 showing the calender roller support ends 310, 312 in an expanded position and the roller 350, 352 detached.
Figure 7:
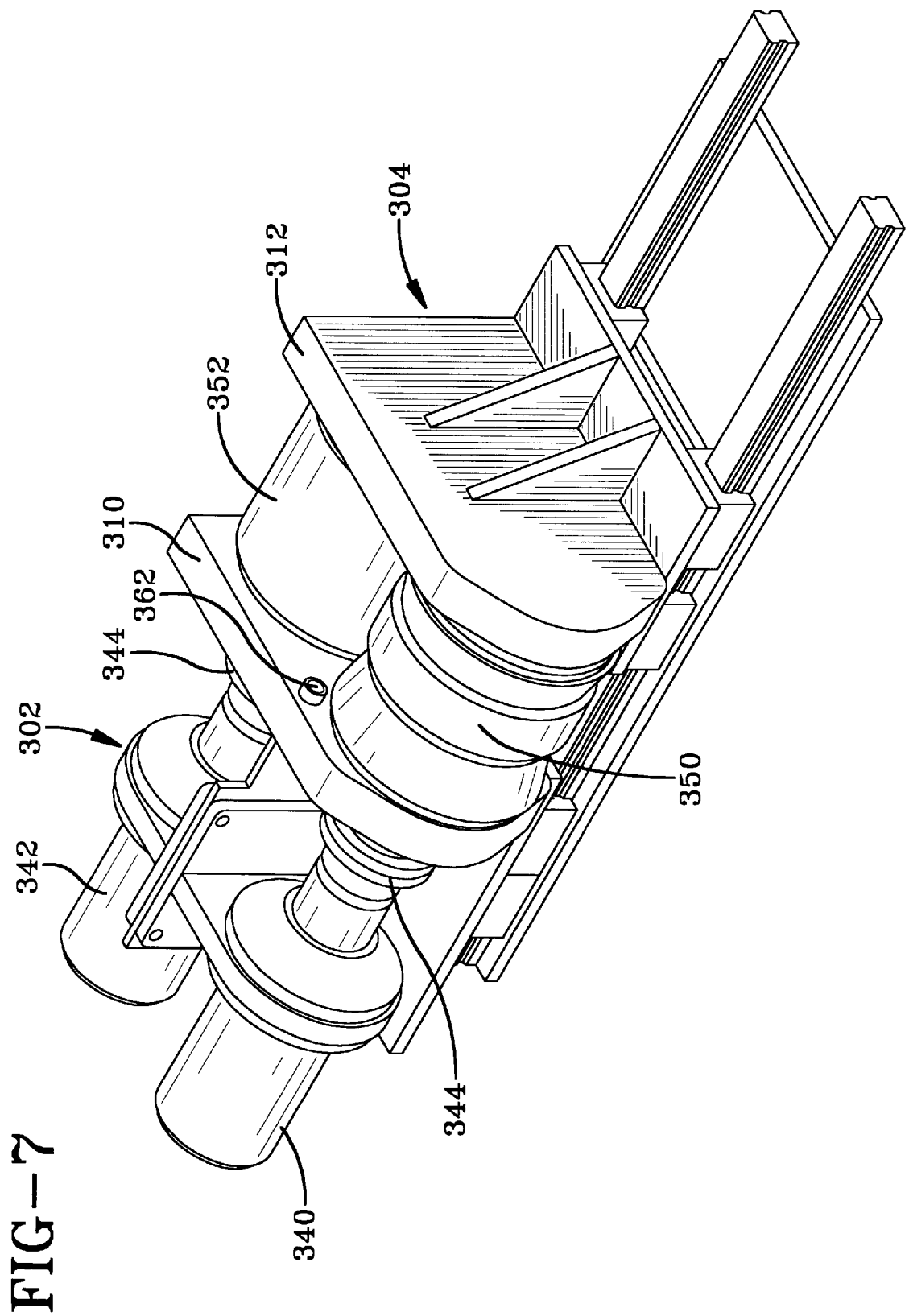
FIG. 7 is a perspective view of the calender 302 with rollers 350, 352 attached.

As shown in FIGS. 5 through 11 each calender assembly 302 is adapted for quick roller changeover. This feature is accomplished in part by the method of attaching the roller cylinder 350, 352 to a pair of tapered hubs 314, 316 and by providing a means 322 for slidably expanding and retracting relative to one another the first and second ends 310, 312 of the means 304 for supporting the calender rollers. As shown in FIG. 6 the second end 312 is slidably attached to the frame 180 of the apparatus 200 and upon actuation of a hydraulic cylinder 322 the second end 312 can slidably expand or retract thus permitting quick removal of the calender roller 350, 352.

Figure 10:
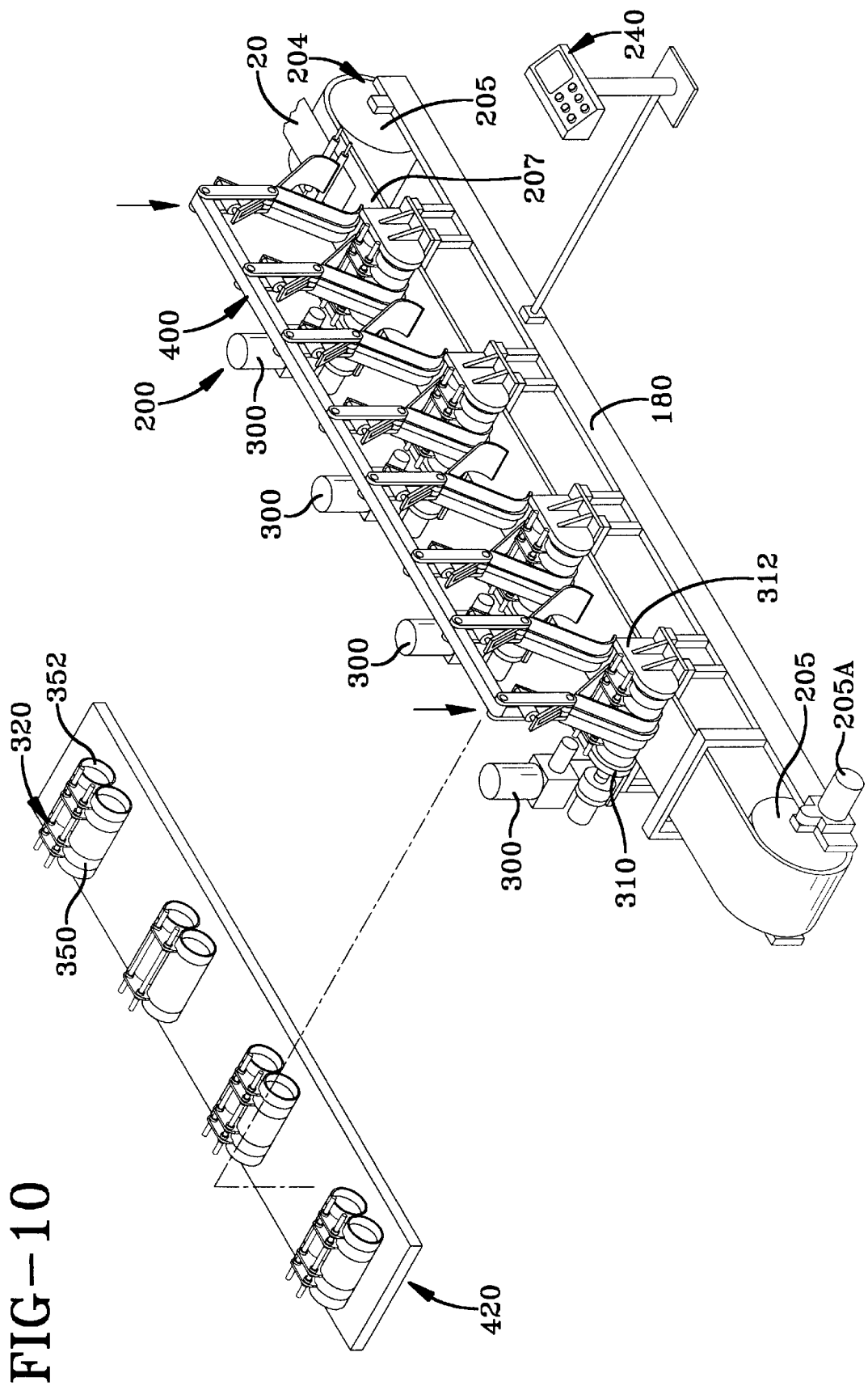
FIG. 10 is second view of the roller transfer mechanism 400 depicting rollers 350, 352 being inserted into the apparatus.
Figure 11:
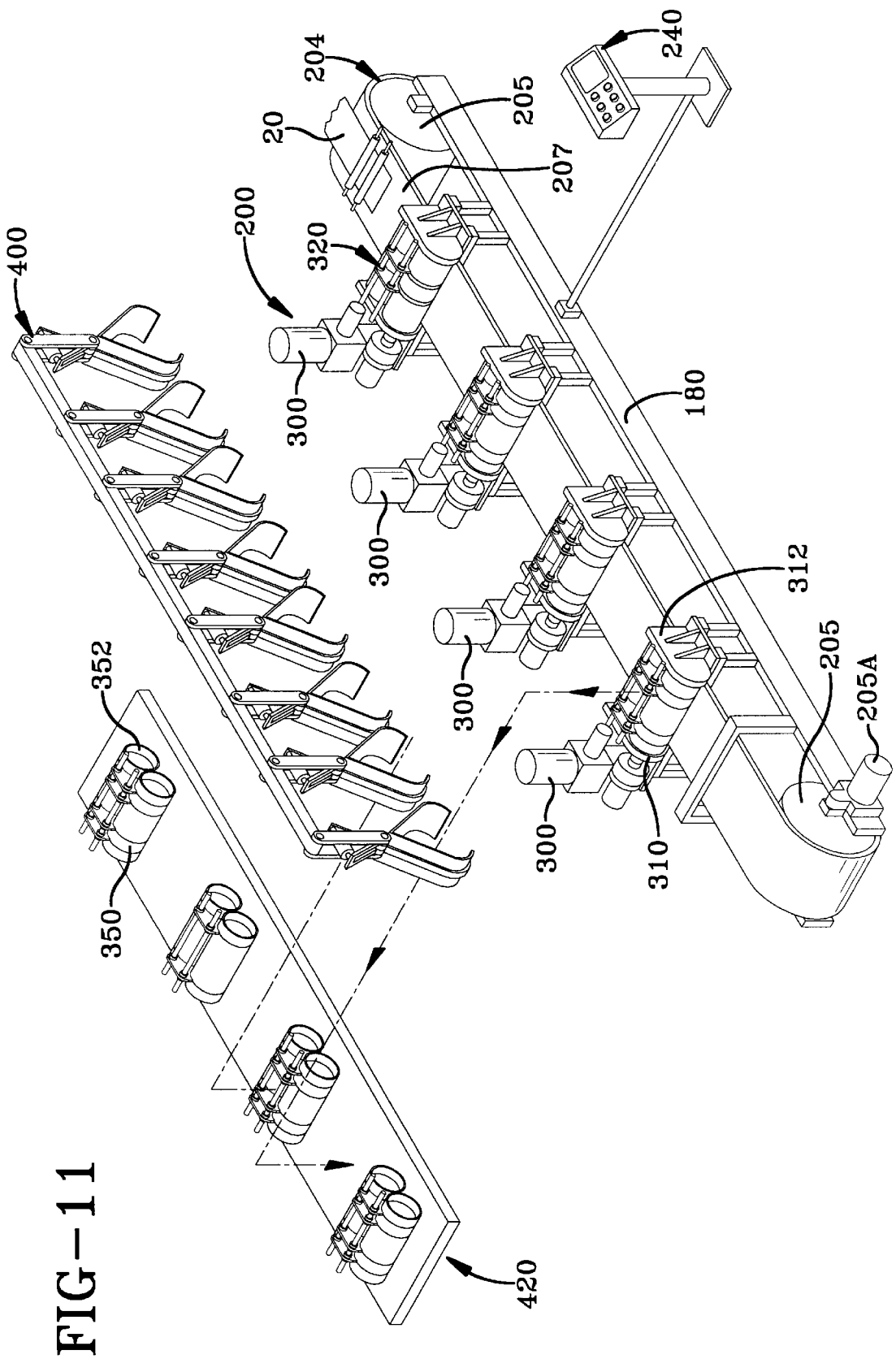
FIG. 11 is a third view of the transfer mechanism 400 being moved to a roller staging area 420.
Figure 12:
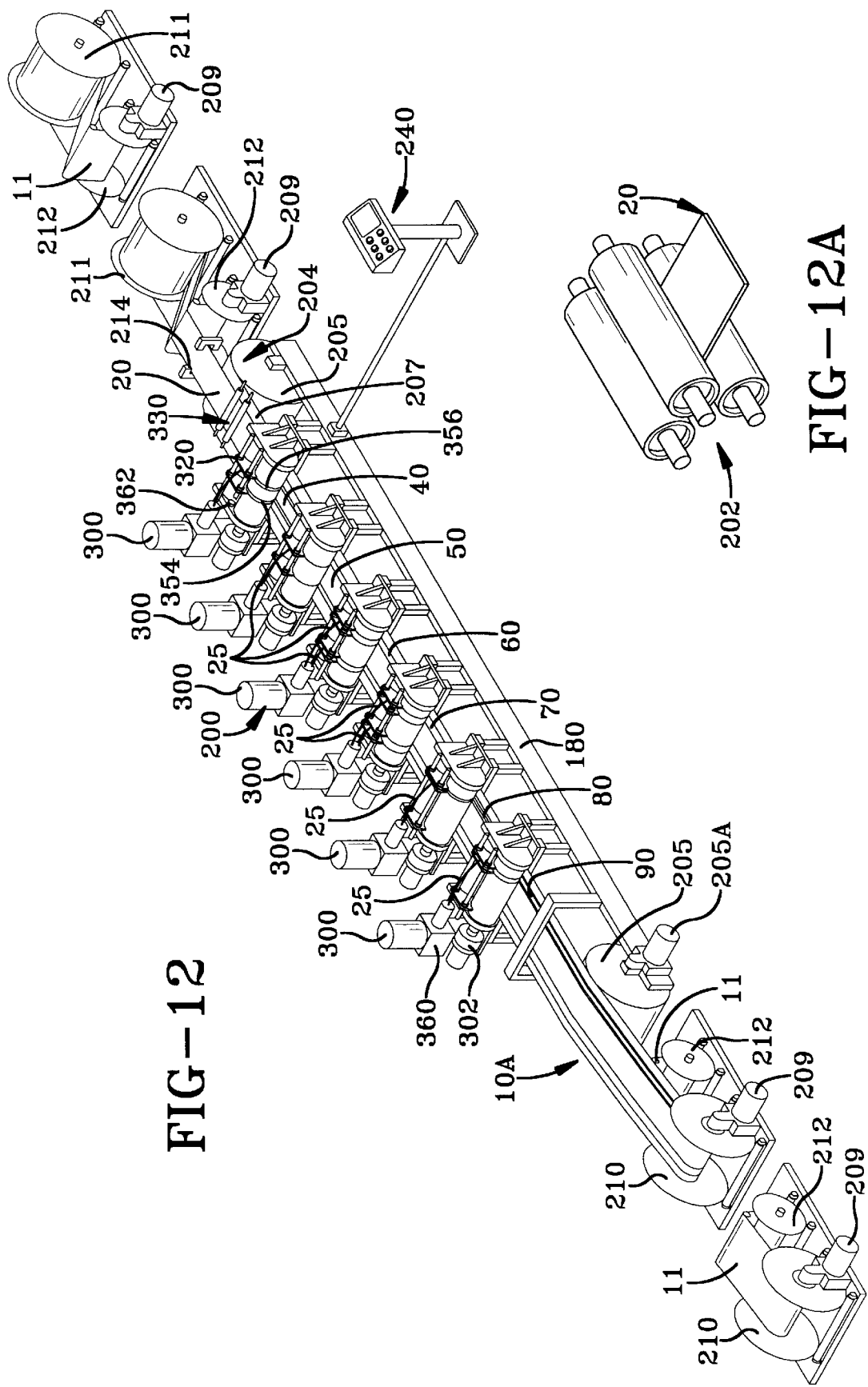
FIG. 12 illustrates a perspective view of one embodiment of the apparatus 200 made in accordance with the invention, the laminate 10 not including apexes 30.

FIGS. 9 through 11 illustrate how pairs of these quick change rollers 350, 352 can be conveyed by an overhead transfer mechanism 400 to initially add the roller pairs to the apparatus 200. The mechanism 400 is lowered into position where the end of the support means 312 is closed to secure the calender rollers 350, 352 into position as in FIG. 10. The overhead mechanism is then moved back to a roller staging area 420 awaiting the next set of roller pairs 350, 352 to build a different size or style tire 100.

Figure 13:
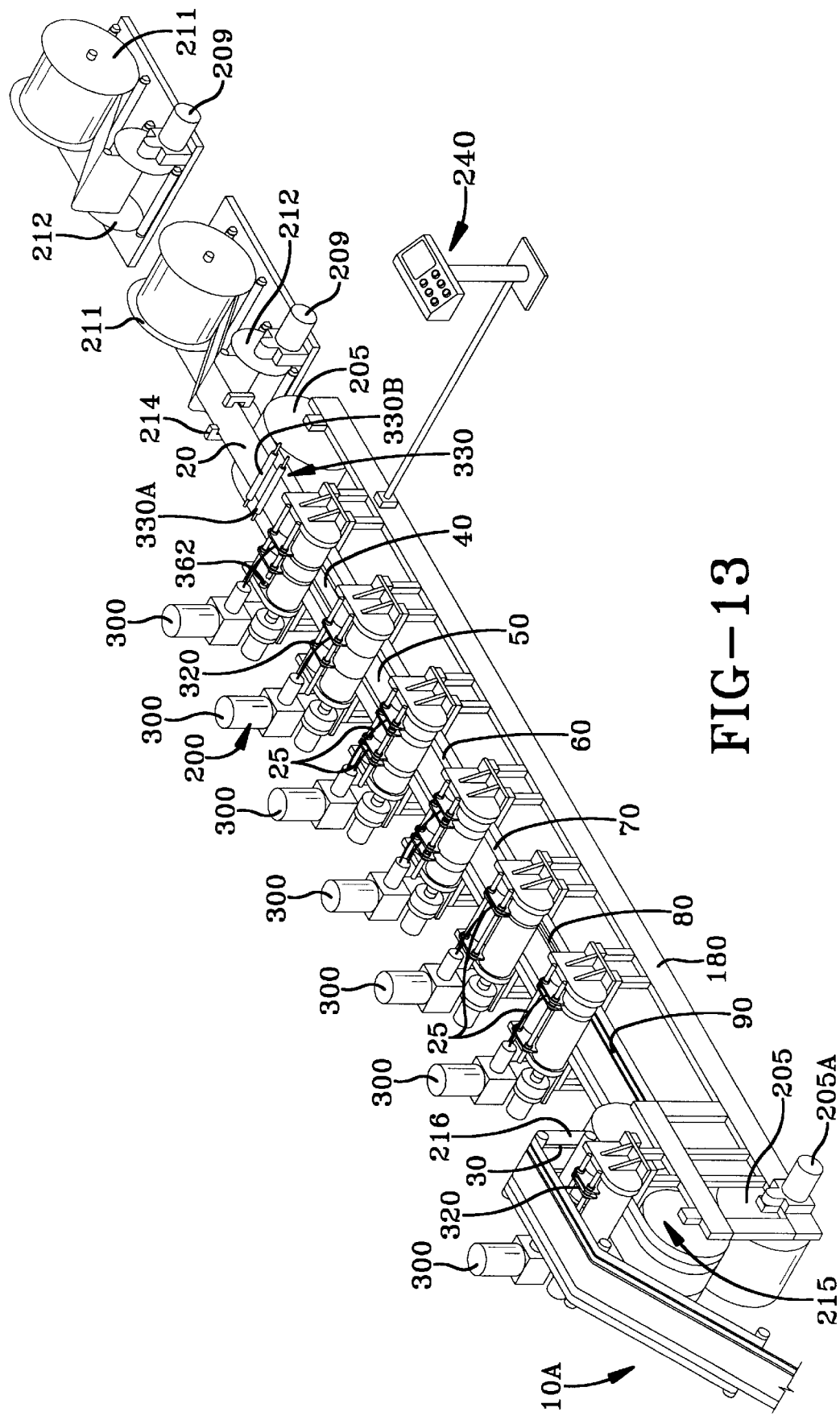
FIG. 13 illustrates a perspective view of a second embodiment of the apparatus 200 made in accordance with the invention, the laminate 10 formed with apexes 30.
Figure 14A:
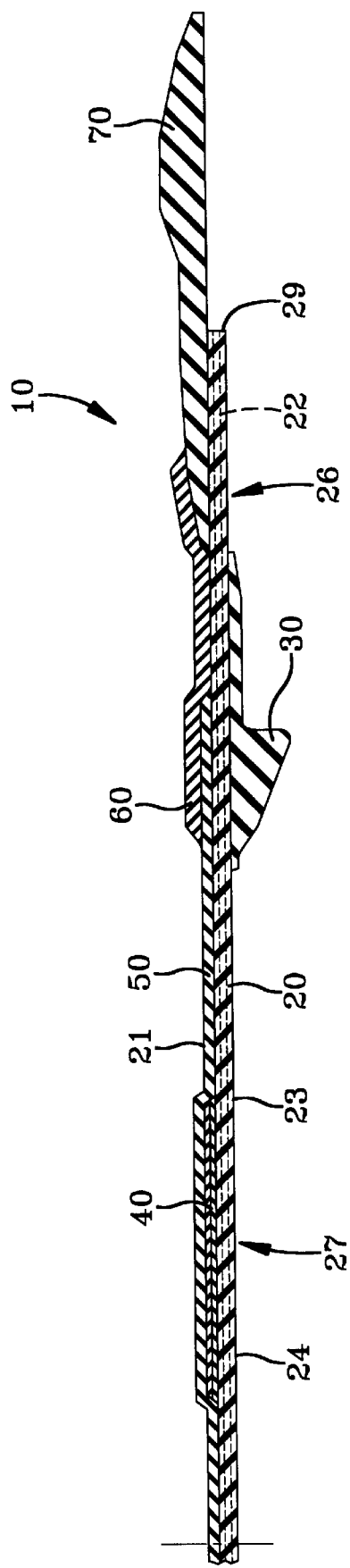
FIG. 14 illustrates one half of the laminate carcass subassembly 10 cross section prior to being formed cylindrically upon a tire building drum, the building drum not illustrated. The opposite half of the laminate 10 not illustrated is identical to the illustrated portion.
FIGS. 14B–14F show the laminate in various additional views.
FIG. 14G shows the laminate 10 toroidally shaped after splicing.
Figure 14B:
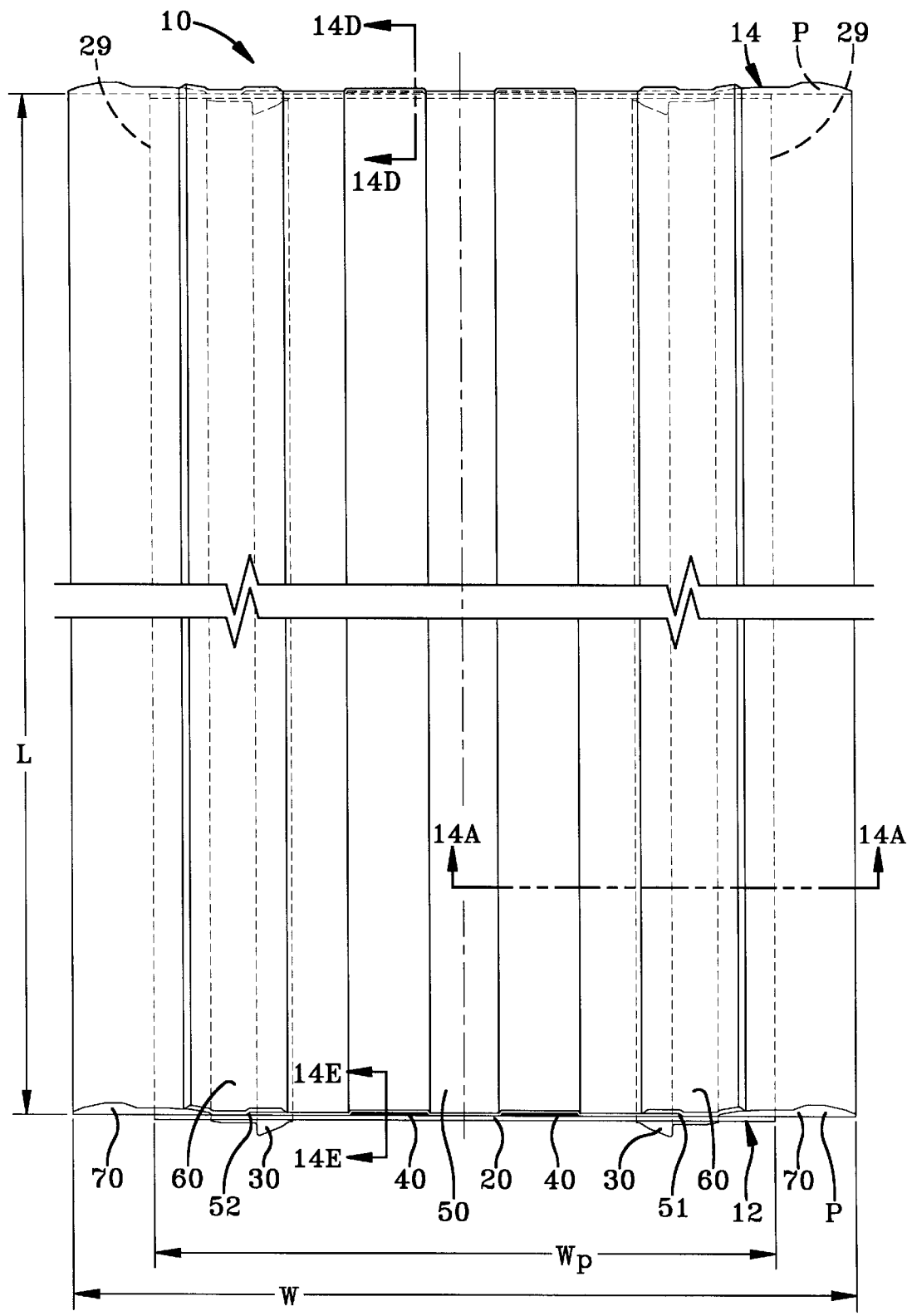
Figure 14C:
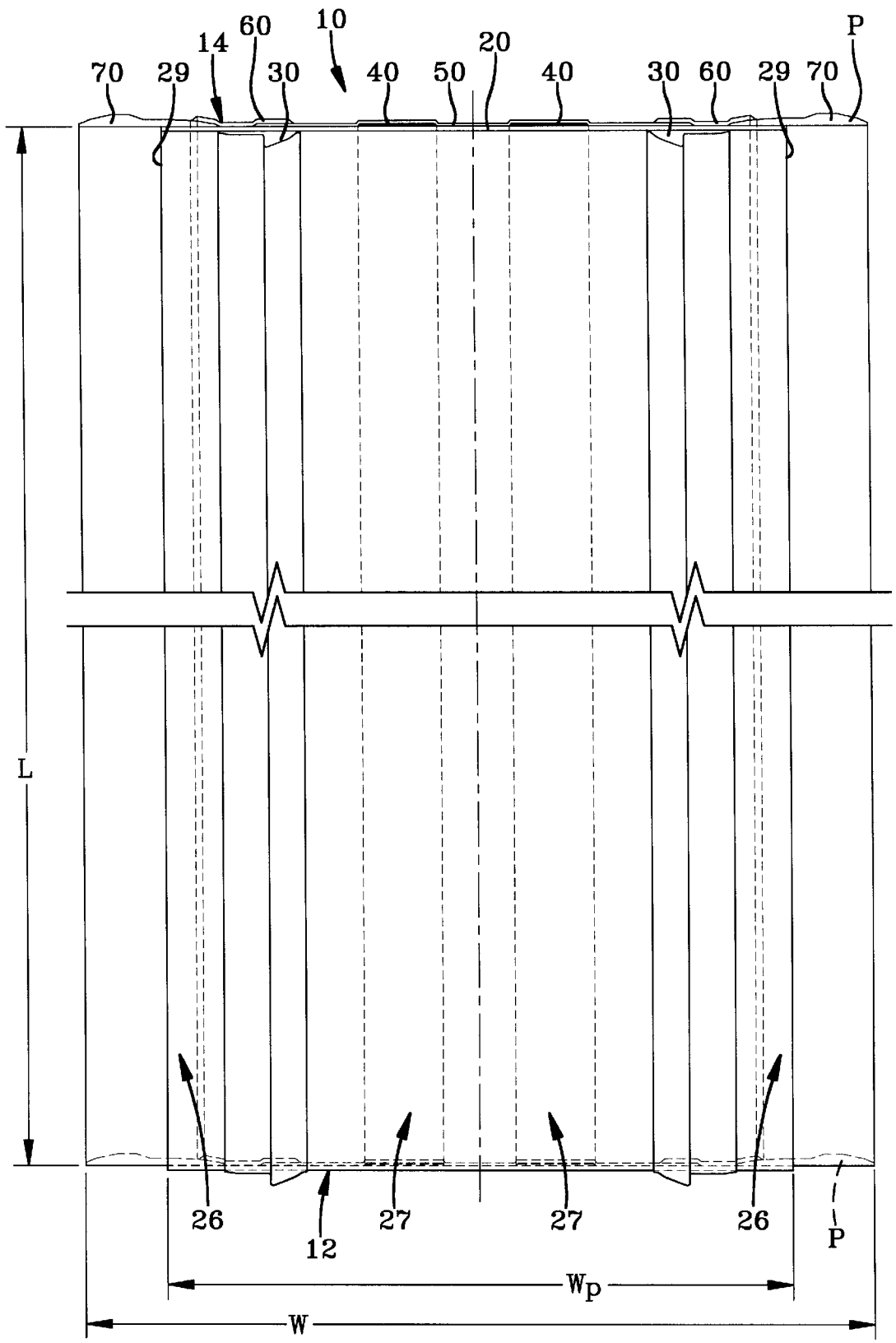
Figure 14G:
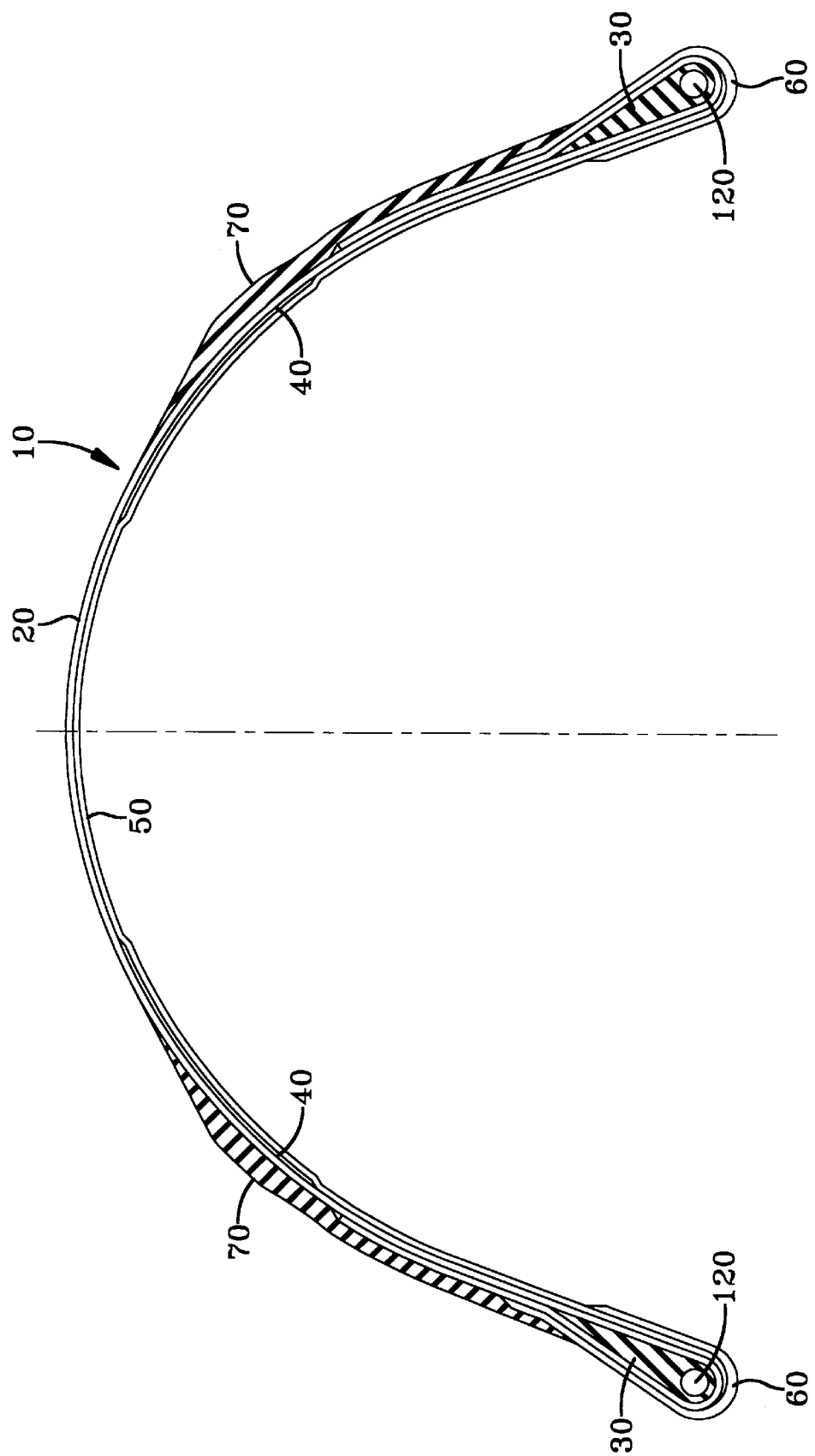

With regard to FIG. 13 it can be seen that when adding an apex 30 to the conveying ply 20 it is desirable to reorient the ply material 20 such that the other side 23 of the ply material 20 is available to receive the tire component. This is believed best accomplished by transferring the laminate 10A to a second conveyor 214 and then forming and applying the component as previously described and then to pull the laminate 10A off the second conveyor 215 over a series of rollers 216 and then either wind the material onto a roll 210 or cut it to the desired carcass length for immediate assembly into a cylindrical carcass 10 at one or more tire building stations.

The apparatus 200 as illustrated has the conveying material 20 supported on a stainless endless belt 207. At each calender assembly station 300 a means 500 is provided for applying the plurality of continuous strips of elastomeric tire components to at least one side 21, 23 of the conveying material 20 while the member 20 is being conveyed to form a laminate 10A. The means 500 for applying as shown is a pinch roller 502 located below the stainless belt 207. The pinch roller 502 applies localized pressure between the belt 207 and conveying member 20 and the transfer roller 350 which is carrying the formed tire component. This applied pressure adheres the component to the member and thereby released the component from the transfer roller.

With regard to FIG. 2A it can be seen that when adding a shoulder strip to the liner 50, when the liner 50 is the conveying member 20 supplied in rolls 211, it is desirable to reorient the material 20 such that the second side 52 of the liner material 50 is available to receive the tire component. This is believed best accomplished by transferring the laminate 10A to a second conveyor 215 and then forming and applying the component as previously described and then to pull the laminate 10A off the second conveyor 215 over a series of rollers 216 and then either wind the material onto a roll 210 or cut it to the desired subassembly length for immediate assembly into a cylindrical subassembly 10 at one or more tire building stations.

The above method of forming and applying the tire components to the conveying subassembly not only provides a more precise method of manufacture, it also increases the overall adhesion of the various components. By being formed and laminated to the conveying components while still hot these strips of components have adhesion characteristics that are far superior to the prior art methods.

Figure 8:
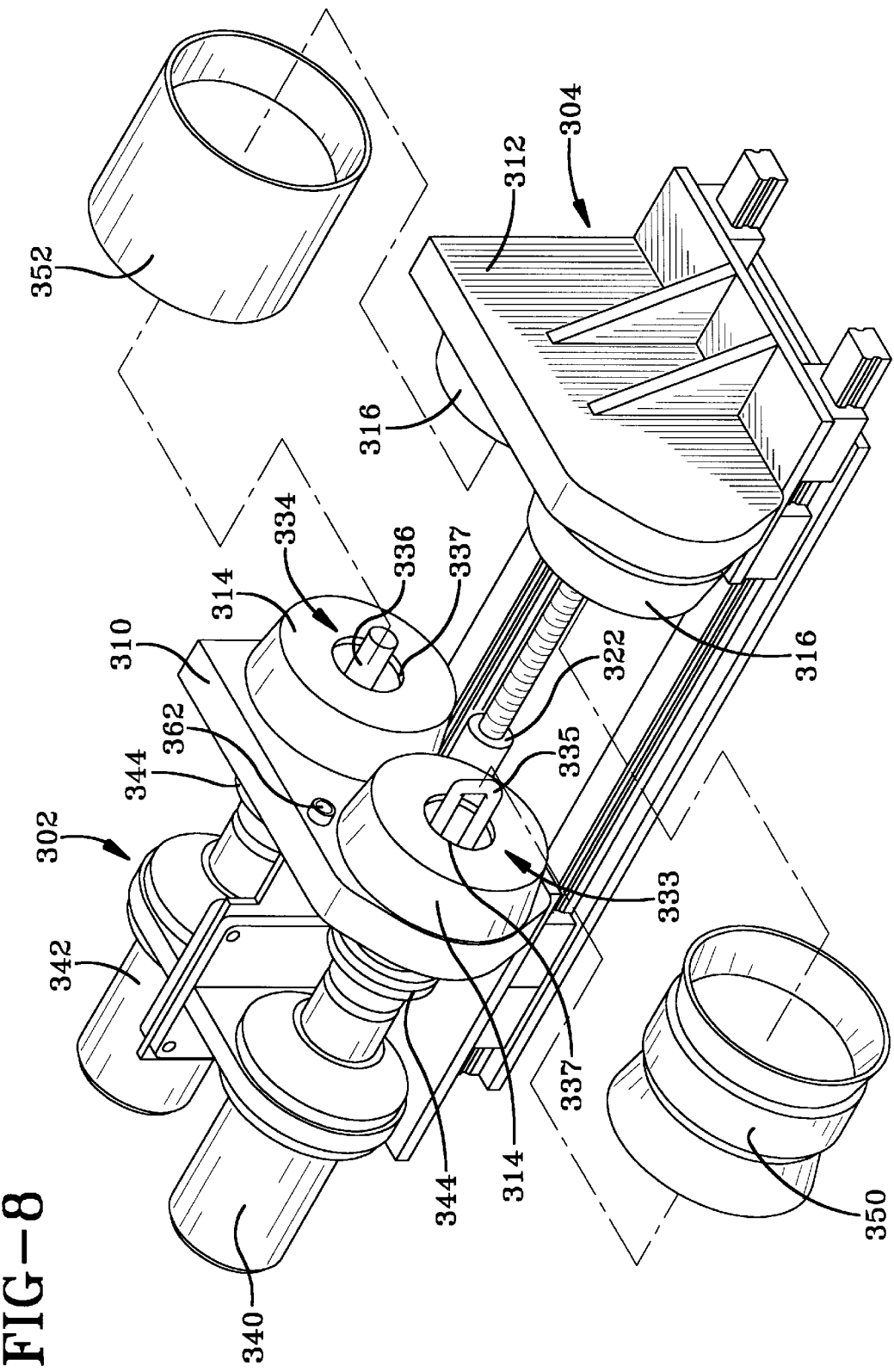
FIG. 8 is a perspective view of the calender 302 with rollers 350, 352 detached.

By winding the laminate 10A onto rolls 210 or by immediately building the cylindrical tire casing subassembly 10 the hot components are prevented from creating a differential shrinkage relative to the individual tire components or the carrier material 20 which can be generally cool upon assembly. Alternatively, although not required the carrier material 20 can be heated to approximate the temperature of the components. By using the liner component 50 formed at the apparatus in place of the carrier member 20 further avoids temperature related shrinkage differentials. In one embodiment the calender assembly 302 includes a means for heating 333 or a means for cooling 334 the calender rollers 350, 352. The means for heating 333 has a heating element 335 and the means for cooling 334 has a cooling element 336. The means 333, 334 enter through an opening 337 in the hubs 314 or 316 as shown in FIG. 8. Each means 333, or 334 generates heating or cooling to the internal surfaces of the rollers 350, 352 and are employed when the material being processed can be more efficiently applied using such a feature.

It is believed that the method and apparatus 200 described and claimed is a significant advancement in the state of tire building technology. Tires built according to the description of this and the related applications have yielded excellent burst strength while achieving superior building uniformity characteristics.

What is claimed is:

1. An apparatus for building a laminate from an assembly of tire components suitable for use in a pneumatic tire casing, the apparatus comprising:
   a means for conveying a subassembly of tire casing components with the width of the subassembly oriented at an angle perpendicular relative to the direction of conveyance;
   a means for forming a plurality of continuous strips of elastomeric tire casino components, the means for forming the plurality of continuous strips of elastomeric tire casing components including a plurality of calender assemblies at spaced locations, each assembly having two calender rollers, a means for releasing a calender roller for permitting quick removal from the calender assembly, and a means for delivering processed elastomeric material to a nip between the calender rollers, at least one of the calender rollers in each assembly has one or more component forming depressions wherein each depression is for forming a strip of tire casing component to a predetermined cross-sectional profile for a particular size or style tires;
   a means for simultaneously attaching each of the formed continuous strips of tire casing components directly from the component forming depression of the calender roller to the means for conveying one or more of the components of the subassembly while the subassembly is being linearly conveyed and as the continuous strips are being formed thereby, to form the laminate.

2. The apparatus for building a laminate from an assembly of tire components suitable for use in a pneumatic tire casing of claim 1, the apparatus further comprising:
   an elastomeric ply material reinforced by cords, the ply material being suitable for use as a tire ply, the ply material having a first and a second side, the cords being embedded in the elastomeric material and being parallel and substantially equally spaced relative to adjacent cords; wherein the
   means for simultaneously attaching each of the formed continuous strips of tire components directly from the component forming depression of the calender roller applies the formed strips of tire components to at least one side of the ply while the ply is being linearly conveyed and as the continuous strips are being formed, thereby to form the laminate.

3. The apparatus as claimed of claim 2, wherein the means for conveying the subassembly includes a conveyor assembly.

4. The apparatus of claim 2 further comprising a stitcher mechanism, the stitcher mechanism adhering the ply material to the means for conveying.

5. The apparatus of claim 3 wherein the conveying means include a stainless steel belt.

6. The apparatus of claim 3 further comprising a pinch roller located directly under the conveyor and each transfer calender roller, the pinch roller applying pressure to transfer the rubber component from the transfer calender roller to the ply material.

7. The apparatus of claim 2 further comprising a means for heating a calender roller.

8. The apparatus of claim 2 further comprising a means for cooling a calender roller.

9. The apparatus as claimed in claim 1, the apparatus further comprising;
   a means for winding and tensioning the laminate onto a roll.

10. The apparatus as claimed in claim 1, wherein each calender assembly has a means for laterally positioning the processed elastomeric material at a predetermined lateral location between the calender rollers.

11. The apparatus as claimed in claim 1, wherein the means for delivering processed elastomeric material includes at least one extruder.

12. The apparatus as claimed in claim 1 wherein the two calender rollers of each calender assembly has one roller being a transfer roller, the other roller being a follower roller, each roller being a hollow cylinder opened at each end and having an axis of rotation.

13. The apparatus as claimed in claim 12, wherein the means for releasing includes a means for supporting the two calender rollers, the means for supporting the rollers having a first and a second end, the first end and second end each have a pair of rotatable hubs, each hub fitting into one end of a roller.

14. The apparatus as claimed in claim 13, wherein the means for supporting the two calender rollers has one first or second end being slidably expandable and retractable relative to the other end.

15. The apparatus as claimed in claim 13, wherein each calender assembly has a motor, a drive shaft powered by the motor and connected to one rotatable hub, the hub providing rotational movement of one of the calender rollers.

16. The apparatus of claim 9 wherein the means for winding the article onto a roll further includes a means for attaching a separation liner to the carcass.

17. The apparatus of claim 16 wherein the means for winding includes a means for rotating the roll.

18. The apparatus of claim 10 wherein the means for laterally positioning the processed elastomeric material is at least one pair of plows, each plow being laterally adjacent to a lateral end of a component forming depression located on one of the calender rollers.

19. The apparatus of claim 13 wherein each calender assembly, has two separate variable speed motors for driving the rollers, one motor driving each roller, the transfer roller being in synchronized rotation relative to the linear movement of the conveyed subassembly.

20. The apparatus of claim 1 further comprising a carrier member, the carrier member being a unreinforced liner; and a stitcher mechanism, the stitcher mechanism adhering the carrier member to the means for conveying.

* * * * *